US011634673B2

(12) United States Patent
Cramer et al.

(10) Patent No.: US 11,634,673 B2
(45) Date of Patent: Apr. 25, 2023

(54) PRODUCTION OF BREWER'S WORT HAVING INCREASE FERMENTABLE SUGARS FOR FERMENTATION

(71) Applicant: DuPont Nutrition Biosciences APS, Copenhagen K (DK)

(72) Inventors: Jacob Flyvholm Cramer, Højbjerg (DK); Tove Bladt, Skanderborg (DK)

(73) Assignee: DUPONT NUTRITION BIOSCIENCES APS, Kongens Lyngby (DK)

( * ) Notice: Subject to any disclaimer, the term of this patent is extended or adjusted under 35 U.S.C. 154(b) by 350 days.

(21) Appl. No.: 16/651,042

(22) PCT Filed: Sep. 19, 2018

(86) PCT No.: PCT/US2018/051733
§ 371 (c)(1),
(2) Date: Mar. 26, 2020

(87) PCT Pub. No.: WO2019/067287
PCT Pub. Date: Apr. 4, 2019

(65) Prior Publication Data
US 2020/0263115 A1 Aug. 20, 2020

Related U.S. Application Data

(60) Provisional application No. 62/565,210, filed on Sep. 29, 2017.

(51) Int. Cl.
*C12C 12/02* (2006.01)
*C12C 5/00* (2006.01)
*C12C 11/00* (2006.01)
*C12C 12/00* (2006.01)

(52) U.S. Cl.
CPC ............ *C12C 5/004* (2013.01); *C12C 11/003* (2013.01); *C12C 12/002* (2013.01); *C12C 12/02* (2013.01)

(58) Field of Classification Search
CPC ....... C12C 12/002; C12C 11/003; C12C 9/02; C12C 12/02; C12C 5/004
See application file for complete search history.

(56) References Cited

U.S. PATENT DOCUMENTS

| 4,247,637 A | 1/1981 | Tamura et al. |
| 4,794,175 A | 12/1988 | Nunberg et al. |
| 4,863,864 A | 9/1989 | Ashikari et al. |
| 5,024,941 A | 6/1991 | Maine et al. |
| 6,255,084 B1 | 7/2001 | Nielsen et al. |
| 6,620,924 B2 | 9/2003 | Nielsen et al. |
| 7,413,887 B2 | 8/2008 | Dunn-Coleman et al. |

FOREIGN PATENT DOCUMENTS

| WO | 3809795 A1 | 12/1988 |
| WO | 2005052148 A2 | 6/2005 |
| WO | 2006060062 A2 | 6/2006 |
| WO | 2014029808 A1 | 2/2014 |
| WO | 2014092960 A1 | 6/2014 |
| WO | 2016100871 A1 | 6/2016 |
| WO | 2017112631 A1 | 6/2017 |

OTHER PUBLICATIONS

Altschul et al., "Local Alignment Statistics", Meth. Enzymol., vol. 266, 1996, pp. 460-480.
Altschul et al., "Basic Local Alignment Search Tool", J. Mol. Biol., vol. 215, 1990, pp. 403-410.
Ashikari et al., "Direct fermentation of raw corn to ethanol by yeast transformants containing a modified Rhizopus glucoamylase gene", Applied Microbiology and Biotechnology, vol. 32, 1989, pp. 129-132.
Ashikari et al., "Rhizopus Raw-Starch-Degrading Glucoamylase: Its Cloning and Expression in Yeast", Agric. Biol. Chem., vol. 50 (4), 1986, pp. 957-964.
Boel et al., "Glucoamylases G1 and G2 from Aspergillus niger are synthesized from two different but closely related mRNAs", The EMBO Journal, vol. 3, No. 5, 1984, pp. 1097-1102.
Devereux et al., "A comprehensive set of sequence analysis programs for the VAX", Nucleic Acid Res., vol. 12, 1984, pp. 387-395.
Feng et al., "Progressive Sequence Alignment as a Prerequisite to Correct Phylogenetic Trees", J Mol Evol, vol. 25, 1987, pp. 351-360.
Hayashida et al., "Molecular Cloning of the Glucoamylase I Gene of *Aspergillus awamori* var. *kawachi* for Localization of the Raw-starch-affinity Site", Agricultural and Biological Chemistry, vol. 53, No. 4, 1989, pp. 923-929.
Higgins et al., "Fast and sensitive multiple sequence alignments on a microcomputer", CABIOS Communications, vol. 5, No. 2, 1989, pp. 151-153.
Karlin et al., "Applications and statistics for multiple high-scoring segments in molecular sequences", Proc. Natl. Acad. Sci. USA, vol. 90, Jun. 1993, pp. 5873-5777.
Needleman et al., "A general method applicable to the search for similarities in the amino acid sequence of two proteins", J Mol Biol. vol. 48(3), Mar. 1970, pp. 443-453.
Pearson et al., "Improved tools for biological sequence comparison", Proc. Natl. Acad. Sci. USA, vol. 85, Apr. 1988, pp. 2444-2448.
Smith et al., "Comparison of biosequences", Advances in Applied Mathematics, vol. 2, Issue 4, Dec. 1981, pp. 482-489.

(Continued)

*Primary Examiner* — Vera Stulii

(57) ABSTRACT

The present disclosure provides methods, compositions, apparatuses and kits comprising two or more distant related glucoamylases in mashing having a synergistic effect on the released fermentable DPI sugar. Increased levels of DPI being primarily glucose is of high importance for high attenuation brewing applied for brewing low carb or light beers. In some embodiments, the present disclosure provides methods, apparatuses; compositions and kits for the use of two or more glucoamylases to increase the apparent specific activity in the mashing operation.

21 Claims, 1 Drawing Sheet
Specification includes a Sequence Listing.

(56) References Cited

OTHER PUBLICATIONS

Svensson et al., "The Complete Amino Acid Sequence of the Glycoprotein Glucoamylase G1, From Aspergillus Niger", Carlsberg Res. Commun., vol. 48, 1983, pp. 529-544.
International Search Report and Written Opinion from PCT App. No. PCT/US2018/051733 dated Jan. 4, 2019, 10 pages.

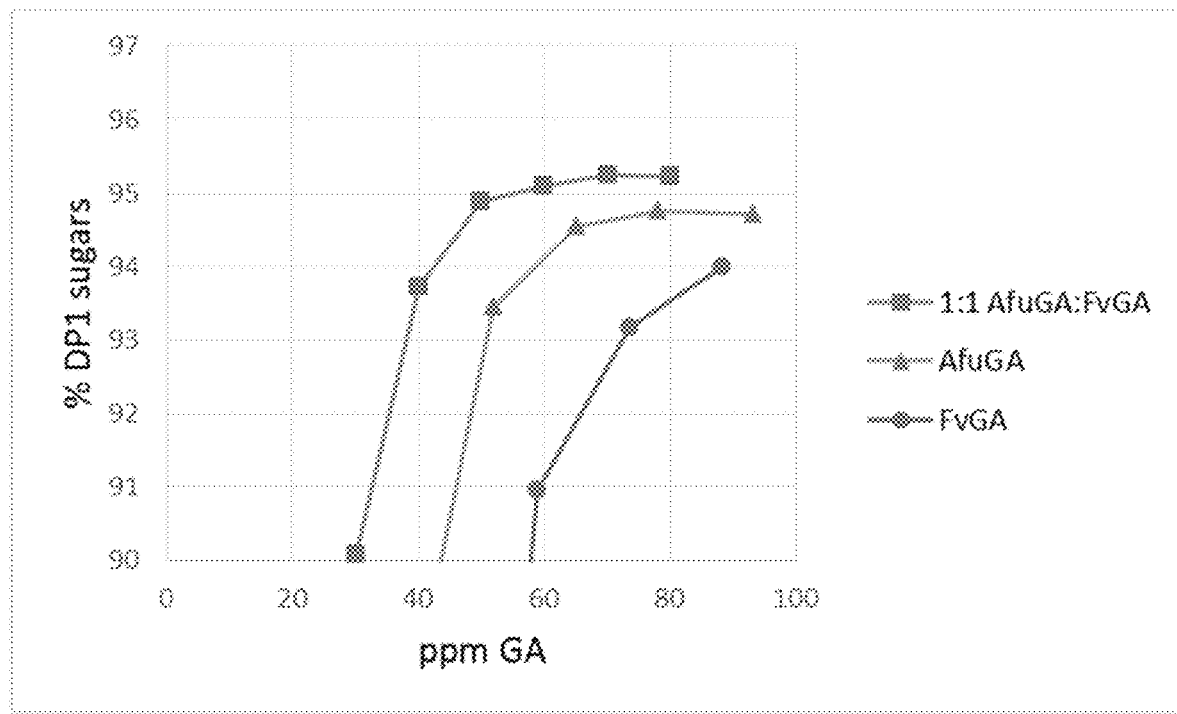

Figure 1 shows a graph with the concentration of DP1 sugars obtained in the wort (in % of all sugar) as function of the glucoamylase dosage in ppm. Wort was analyzed after mashing 240 minutes at 64°C. The concentration of DP1 sugars is shown in the region from 90-97%. Three glucoamylase preparations were applied: AfuGA (filled triangles), FvGA (filled circles) and 1:1 AfuGA:FvGA (filled squares).

PRODUCTION OF BREWER'S WORT HAVING INCREASE FERMENTABLE SUGARS FOR FERMENTATION

BACKGROUND OF THE INVENTION

In the production of beer, during the mashing step, fermentable sugars are generated from starch which are subsequently converted into ethanol by yeast. However, not all starch is converted into fermentable sugars. Short glucose oligomers remain after mashing which cannot be converted into ethanol by brewer's yeast. These oligomers, also called dextrins, are usually 4 sugar units and above (DP4+). After lautering of the mash, the wort typically contains about 65 to 80% fermentable sugar and 20 to 35% soluble dextrin which is not fermentable, i.e., will not be converted into ethanol. The presence of non-fermentable sugars in a beer causes a beer to have more calories than a beer fermented from a wort having more fermentable sugars.

There remains a need in the art for methods to produce worts having less non-fermentable sugars and more fermentable sugars to produce beers with a lower calorie content.

SUMMARY OF THE INVENTION

In an aspect of the present invention, a method for producing a brewer's wort having increased DP1 sugar is presented having the step of adding to a mash having a grist a first glucoamylase and a second glucoamylase wherein the first glucoamylase is not the same as the second glucoamylase to produce the brewer's wort.

Optionally, the first and said second glucoamylase are obtained from a filamentous fungus.

Optionally, the filamentous fungus is selected from the group consisting of *Acremonium, Agaricus, Alternaria, Aspergillus, Aureobasidium, Botryosphaeria, Ceriporiopsis, Chaetomidium, Chrysosporium, Claviceps, Cochliobolus, Coprinopsis, Coptotermes, Corynascus, Cryphonectria, Cryptococcus, Diplodia, Exidia, Filibasidium, Fusarium, Gibberella, Holomastigotoides, Humicola, Irpex, Lentinula, Leptospaeria, Magnaporthe, Melanocarpus, Meripilus, Mucor, Myceliophthora, Neocallimastix, Neurospora, Paecilomyces, Penicillium, Phanerochaete, Piromyces, Poitrasia, Pseudoplectania, Pseudotrichonympha, Rhizomucor, Schizophyllum, Scytalidium, Talaromyces, Thermoascus, Thielavia, Tolypocladium, Trichoderma, Trichophaea, Verticillium, Volvariella*, and *Xylaria*.

Optionally, the first and second glucoamylases are from different filamentous fungi.

Optionally, the filamentous fungus is selected from the group consisting of *Acremonium cellulolyticus, Aspergillus aculeatus, Aspergillus awamori, Aspergillus fumigatus, Aspergillus foetidus, Aspergillus japonicus, Aspergillus nidulans, Aspergillus niger, Aspergillus oryzae, Chrysosporium keratinophilum, Chrysosporium lucknowense, Chrysosporium tropicum, Chrysosporium merdarium, Chrysosporium inops, Chrysosporium pannicola, Chrysosporium queenslandicum, Chrysosporium zonatum, Fusarium bactridioides, Fusarium cerealis, Fusarium crookwellense, Fusarium culmorum, Fusarium graminearum, Fusarium graminum, Fusarium heterosporum, Fusarium negundi, Fusarium oxysporum, Fusarium reticulatum, Fusarium roseum, Fusarium sambucinum, Fusarium sarcochroum, Fusarium sporotrichioides, Fusarium sulphureum, Fusarium torulosum, Fusarium trichothecioides, Fusarium venenatum, Humicola grisea, Humicola insolens, Humicola lanuginosa, Irpex lacteus, Mucor miehei, Myceliophthora thermophila, Neurospora crassa, Penicillium funiculosum, Penicillium purpurogenum, Phanerochaete chrysosporium, Penicillium thomii, Penicillium oxalicum, Thielavia achromatica, Thielavia albomyces, Thielavia albopilosa, Thielavia australeinsis, Thielavia fimeti, Thielavia microspora, Thielavia ovispora, Thielavia peruviana, Thielavia spededonium, Thielavia setosa, Thielavia subthermophila, Thielavia terrestris, Trichoderma harzianum, Trichoderma koningii, Trichoderma longibrachiatum, Trichoderma reesei*, or *Trichoderma viride*.

Optionally, the filamentous fungus is selected from the group consisting of *Aspergillus fumigatus, Fusarium venenatum*, and *Trichoderma reesei*.

Optionally, the first and/or said second glucoamylases are variants of a glucoamylase from *Aspergillus fumigatus, Fusarium venenatum*, and *Trichoderma reesei*.

Optionally, the first and second glucoamylase have 60% or less sequence identity.

Optionally, the first and second glucoamylase have 58% or less sequence identity.

Optionally, the first and second glucoamylase have 56% or less sequence identity.

Optionally, the first and second glucoamylase have 54% or less sequence identity.

Optionally, the first and second glucoamylase have 52% or less sequence identity.

Optionally, the first and said glucoamylase have 50% or less sequence identity.

Optionally, the first and second glucoamylases are selected from the group consisting of a *Fusarium venenatum* glycoamylase as set forth in SEQ ID NO: 1 (FvGA) or a sequence having at least 80% identity thereto, a *Aspergillus fumigatus* glucoamylase as set forth in SEQ ID NO: 2 (AfuGA) or a sequence having at least 80% identity thereto, a *Trichoderma reesei* glucoamylase as set forth in SEQ ID NO: 3 (TrGA) or a sequence having at least 80% identity thereto, a first *Trichoderma reesei* variant glucoamylase as set forth in SEQ ID NO: 4 (TrGA earl) or a sequence having at least 80% identity thereto and a second *Trichoderma reesei* variant glucoamylase as set forth in SEQ ID NO: 5 TrGA_var2 or a sequence having at least 80% identity thereto.

Optionally, the first and second glucoamylases are selected from the group consisting of FvGA as set forth in SEQ ID NO: 1 or a sequence having at least 90% identity thereto, AfuGA as set forth in SEQ ID NO: 2 or a sequence having at least 90% identity thereto, TrGA as set forth in SEQ ID NO: 3 or a sequence having at least 90% identity thereto, TrGA_var1 as set forth in SEQ ID NO: 4 or a sequence having at least 90% identity thereto and TrGA_var2 as set forth in SEQ ID NO: 5 or a sequence having at least 90% identity thereto.

Optionally, the first and second glucoamylases are selected from the group consisting of FvGA as set forth in SEQ ID NO: 1 or a sequence having at least 95% identity thereto, AfuGA as set forth in SEQ ID NO: 2 or a sequence having at least 95% identity thereto, TrGA as set forth in SEQ ID NO: 3 or a sequence having at least 95% identity thereto, TrGA_var1 as set forth in SEQ ID NO: 4 or a sequence having at least 95% identity thereto and TrGA_var2 as set forth in SEQ ID NO: 5 or a sequence having at least 95% identity thereto.

Optionally, the first and second glucoamylases are selected from the group consisting of FvGA as set forth in SEQ ID NO: 1 or a sequence having at least 99% identity thereto, AfuGA as set forth in SEQ ID NO: 2 or a sequence having at least 99% identity thereto, TrGA as set forth in SEQ ID NO: 3 or a sequence having at least 99% identity thereto, TrGA_var1 as set forth in SEQ ID NO: 4 or a sequence having at least 99% identity thereto and TrGA_var2 as set forth in SEQ ID NO: 5 or a sequence having at least 99% identity thereto Optionally, the first and second glucoamylases are selected from the group consisting of FvGA as set forth in SEQ ID NO: 1, AfuGA as set forth in SEQ ID NO: 2, TrGA as set forth in SEQ ID NO: 3, TrGA_var1 as set forth in SEQ ID NO: 4 and TrGA_var2 as set forth in SEQ ID NO: 5.

Optionally, the first and said second glucoamylases are other than TrGA and TrGA_var1, TrGA_var1 and TrGA_var2 or TrGA and TrGA_var2.

Optionally, the first and said second glucoamylases comprise TrGA and FvGA, AFuGA and FvGA, TrGA and AFuGA or TrGA_var2 and FvGA.

Optionally, the first and said second glucoamylases are TrGA and FvGA, AFuGA and FvGA, TrGA and AFuGA or TrGA_var2 and FvGA.

Optionally, the first and second glucoamylases have a predetermined ratio.

Optionally, the first and second glucoamylases are TrGA and FvGA having a mass ratio of about 3:2 or greater. Optionally, the mass ratio is about 4:1.

Optionally, the first and second glucoamylases are AfuGA and FvGA having a mass ratio of about 3:2 or greater. Optionally, the mass ratio is about 4:1.

Optionally, the first and second glucoamylases are TrGA_var2 and FvGA having a mass ratio of about 3:2 or greater. Optionally, the mass ratio is about 4:1.

Optionally, the first and second glucoamylases are TrGA and AFuGA having a mass ratio of about 1:1 or less. Optionally, the mass ratio is about 2:3.

Optionally, the method of producing a brewer's wort with higher DP1 has the further step of adding an enzyme selected from the group consisting of a pullulanase, a protease, a xylanase, a lipase, a cellulase, an amylase, a glucoamylase and a beta glucanase.

Optionally, the wort has less than about 4% DP4/4+, less than about 3.8% DP4/4+, less than about 3.5% DP4/4+ or less than about 3% DP4/4+.

Optionally, the grist contains malt.

Optionally, the grist further contains corn, rice, sorghum, barley, wheat, rye, oats or tapioca or mixtures thereof.

Optionally, the brewer's wort has about 93% or greater DP1.

Optionally, the brewer's wort has about 94% or greater DP1.

Optionally, the brewer's wort is fermented to produce a beer. Optionally, the beer has an RDF of greater than 84%. Optionally, the beer has an RDF of greater than 85%. Optionally, the beer has an RDF of greater than 86%. Optionally, the beer has an RDF of greater than 87%. Optionally, the beer has an RDF of greater than 88%. Optionally, the beer has an RDF of greater than 89%.

BRIEF DESCRIPTION OF THE DRAWINGS

FIG. 1 shows a graph with the concentration of DP1 sugars obtained in the wort (in % of all sugar) as function of the glucoamylase dosage in ppm. Wort was analyzed after mashing 240 minutes at 64° C. The relative concentration of DP1 sugars in the wort is shown in the region from 90-97%. Three glucoamylase preparations were applied: AfuGA (filled triangles), FvGA (filled circles) and 1:1 AfuGA: FvGA (filled squares).

BRIEF DESCRIPTION OF SEQ ID NOS

SEQ ID NO: 1 sets forth the mature amino acid sequence of the glucoamylase from *Fusarium verticillioides* (FvGA).
SEQ ID NO: 2 sets forth the mature amino acid sequence of the glucoamylase from *Aspergillus fumigatus* (AfuGA).
SEQ ID NO: 3 sets forth the mature amino acid sequence of the glucoamylase from *Trichoderma reesie* (TrGA).
SEQ ID NO: 4 sets forth the mature amino acid sequence of the glucoamylase variant from *Trichoderma reesie* including the mutations L417V, T430A, Q511H, A539R and N563I (TrGA_var1).
SEQ ID NO: 5 sets forth the mature amino acid sequence of the glucoamylase variant from *Trichoderma reesie* including the mutations D44R and A539R (TrGA_var2).

Definitions and Abbreviations

Unless defined otherwise, all technical and scientific terms used herein have the same meaning as commonly understood by one of ordinary skill in the art to which this disclosure belongs. Singleton et al., DICTIONARY OF MICROBIOLOGY AND MOLECULAR BIOLOGY, $2^{nd}$ ed., John Wiley and Sons, New York (1994), and Hale & Markham, THE HARPER COLLINS DICTIONARY OF BIOLOGY, Harper Perennial, N.Y. (1991) provide one of skill with the general meaning of many of the terms used herein. Still, certain terms are defined below for the sake of clarity and ease of reference.

As used herein, the term "glucoamylase (EC 3.2.1.3)" refers to an enzyme that catalyzes the release of D-glucose from the non-reducing ends of starch and related oligo- and polysaccharides.

A "variant" or "variants" refers to either polypeptides or nucleic acids. The term "variant" may be used interchangeably with the term "mutant". Variants include insertions, substitutions, transversions, truncations, and/or inversions at one or more locations in the amino acid or nucleotide sequence, respectively. The phrases "variant polypeptide", "polypeptide variant", "polypeptide", "variant" and "variant enzyme" mean a polypeptide/protein that has an amino acid sequence that either has or comprises a selected amino acid sequence of or is modified compared to the selected amino acid sequence, such as SEQ ID NO: 1, 2, 3, 4 or 5.

As used herein, a "homologous sequence" and "sequence identity" with regard to a nucleic acid or polypeptide sequence means having about at least 100%, at least 99%, at least 98%, at least 97%, at least 96%, at least 95%, at least 94%, at least 93%, at least 92%, at least 91%, at least 90%, at least 88%, at least 85%, at least 80%, at least 75%, at least 70%, at least 65%, at least 60%, at least 55%, at least 50%, or at least 45% sequence identity to a nucleic acid sequence or polypeptide sequence when optimally aligned for comparison, wherein the function of the candidate nucleic acid sequence or polypeptide sequence is essentially the same as the nucleic acid sequence or polypeptide sequence the candidate homologous sequence is being compared with. In some embodiments, homologous sequences have between at least about 85% and 100% sequence identity, while in other embodiments there is between about 90% and 100% sequence identity, and in other embodiments, there is at least about 95% and 100% sequence identity.

Homology is determined using standard techniques known in the art (see e.g., Smith and Waterman, *Adv. Appl. Math.* 2: 482 (1981); Needleman and Wunsch, *J. Mol. Biol.* 48: 443 (1970); Pearson and Lipman, *Proc. Natl. Acad. Sci. USA* 85: 2444 (1988); programs such as GAP, BESTHT, FASTA, and TFASTA in the Wisconsin Genetics Software Package (Genetics Computer Group, Madison, Wis.); and Devereux et al., *Nucleic Acid Res.*, 12: 387-395 (1984)).

The "percent (%) nucleic acid sequence identity" or "percent (%) amino acid sequence identity" is defined as the percentage of nucleotide residues or amino acid residues in a candidate sequence that is identical with the nucleotide residues or amino acid residues of the starting sequence. The sequence identity can be measured over the entire length of the starting sequence Homologous sequences are determined by known methods of sequence alignment. A commonly used alignment method is BLAST described by Altschul et al., (Altschul et al., *J. Mol. Biol.* 215: 403-410 (1990); and Karlin et al, *Proc. Natl. Acad. Sci. USA* 90: 5873-5787 (1993)). A particularly useful BLAST program is the WU-BLAST-2 program (see Altschul et al, *Meth. Enzymol.* 266: 460-480 (1996)). WU-BLAST-2 uses several search parameters, most of which are set to the default values. The adjustable parameters are set with the following values: overlap span=1, overlap fraction=0.125, word threshold (T)=11. The HSP S and HSP S2 parameters are dynamic values and are established by the program itself depending upon the composition of the particular sequence and composition of the particular database against which the sequence of interest is being searched. However, the values may be adjusted to increase sensitivity. A % amino acid sequence identity value is determined by the number of matching identical residues divided by the total number of residues of the "longer" sequence in the aligned region. The "longer" sequence is the one having the most actual residues in the aligned region (gaps introduced by WU-Blast-2 to maximize the alignment score are ignored).

Other methods find use in aligning sequences. One example of a useful algorithm is PILEUP. PILEUP creates a multiple sequence alignment from a group of related sequences using progressive, pair-wise alignments. It can also plot a tree showing the clustering relationships used to create the alignment. PILEUP uses a simplification of the progressive alignment method of Feng and Doolittle (Feng and Doolittle, *J. Mol. Evol.* 35: 351-360 (1987)). The method is similar to that described by Higgins and Sharp (Higgins and Sharp, *CABIOS* 5: 151-153 (1989)). Useful PILEUP parameters including a default gap weight of 3.00, a default gap length weight of 0.10, and weighted end gaps. The term "optimal alignment" refers to the alignment giving the highest percent identity score.

As used herein, the term "malt beverage" includes such foam forming fermented malt beverages as full malted beer, ale, dry beer, near beer, light beer, low alcohol beer, low calorie beer, porter, bock beer, stout, malt liquor, non-alcoholic malt liquor and the like. The term "malt beverages" also includes alternative malt beverages such as fruit flavored malt beverages, e.g., citrus flavored, such as lemon-, orange-, lime-, or berry-flavored malt beverages, liquor flavored malt beverages, e.g., vodka-, rum-, or tequila-flavored malt liquor, or coffee flavored malt beverages, such as caffeine-flavored malt liquor, and the like.

As used herein, the term "beer" traditionally refers to an alcoholic beverage derived from malt, which is derived from barley, and optionally adjuncts, such as cereal grains, and flavored with hops. Beer can be made from a variety of grains by essentially the same process. All grain starches are glucose homopolymers in which the glucose residues are linked by either alpha-1,4- or alpha-1,6-bonds, with the former predominating. The process of making fermented malt beverages is commonly referred to as brewing. The principal raw materials used in making these beverages are water, hops and malt. In addition, adjuncts such as common corn grits, refined corn grits, rice, sorghum, refined corn starch, barley, barley starch, dehusked barley, wheat, wheat starch, torrified cereal, cereal flakes, rye, oats, potato, tapioca, and syrups, such as corn syrup, sugar cane syrup, inverted sugar syrup, barley and/or wheat syrups, and the like may be used as a source of starch or fermentable sugar types. The starch will eventually be converted into dextrins and fermentable sugars. For a number of reasons, the malt, which is produced principally from selected varieties of barley, has the greatest effect on the overall character and quality of the beer. First, the malt is the primary flavoring agent in beer. Second, the malt provides the major portion of the fermentable sugar. Third, the malt provides the proteins, which will contribute to the body and foam character of the beer. Fourth, the malt provides the necessary enzymatic activity during mashing.

As used herein, the term "Hops" refers to it use in contributing significantly to beer quality, including flavoring. In particular, hops (or hops constituents) add desirable bittering substances to the beer. In addition, the hops act as protein precipitants, establish preservative agents and aid in foam formation and stabilization.

As used herein, the "process for making beer" is one that is well known in the art, but briefly, it involves five steps: (a) adjunct cooking and/or mashing (b) wort separation and extraction (c) boiling and hopping of wort (d) cooling, fermentation and storage, and (e) maturation, processing and packaging. In the first step, milled or crushed malt is mixed with water and held for a period of time under controlled temperatures to permit the enzymes present in the malt to e.g. convert the starch present in the malt into fermentable sugars. In the second step, the mash is transferred to a "lauter tun" or mash filter where the liquid is separated from the grain residue. This sweet liquid is called "wort" and the left over grain residue is called "spent grain".

The mash is typically subjected to an extraction during mash separation, which involves adding water to the mash in order to recover the residual soluble extract from the spent grain. In the third step, the wort is boiled vigorously. This sterilizes the wort and helps to develop the colour, flavour and odour. Hops are added at some point during the boiling. In the fourth step, the wort is cooled and transferred to a fermentor, which either contains the yeast or to which yeast is added. The yeast converts the sugars by fermentation into alcohol and carbon dioxide gas; at the end of fermentation the fermentor is chilled or the fermentor may be chilled to stop fermentation. The yeast flocculates and is removed. In the last step, the beer is cooled and stored for a period of time, during which the beer clarifies and its flavor develops, and any material that might impair the appearance, flavor and shelf life of the beer settles out. Prior to packaging, the beer is carbonated and, optionally, filtered and pasteurized. After fermentation, a beverage is obtained which usually contains from about 2% to about 10% alcohol by weight. The non-fermentable carbohydrates are not converted during fermentation and form the majority of the dissolved solids in the final beer. This residue remains because of the inability of malt enzymes to hydrolyze the alpha-1,6-linkages of the starch and fully degrade the non-starch polysaccharides. The non-fermentable carbohydrates contribute with less than 50 kilocalories per 12 ounces of a lager beer.

As used herein, the term "light beers, reduced calorie beers or low calorie beers", refers to the recent, widespread popularization of brewed beverages, particularly in the U.S. market. FDA defines "light" foods as having ⅓ fewer calories than a standard reference food/drink, according to this definition these highly attenuated beers have approximately 30% fewer calories than a manufacturer's "normal" beer." Further information on conventional brewing processes may be found in "Technology Brewing and Malting" by Wolfgang Kunze of the Research and Teaching Institute of Brewing, Berlin (VLB), 3rd completely updated edition, 2004, ISBN 3-921690-49-8."

As used herein, the "process for making beer" may further be applied in the mashing of any grist.

As used herein, the term "grist" refers to any starch and/or sugar containing plant material derivable from any plant and plant part, including tubers, roots, stems, leaves and seeds. The grist may comprise grain, such as grain from barley, wheat, rye, oat, corn, rice, milo, millet and sorghum, and more preferably, at least 10%, or more preferably at least 15%, even more preferably at least 25%, or most preferably at least 35%, such as at least 50%, at least 75%, at least 90% or even 100% (w/w) of the grist of the wort is derived from grain. In some embodiments the grist may comprise the starch and/or sugar containing plant material obtained from cassava [*Manihot esculenta*] roots. The grist may comprise malted grain, such as barley malt. Preferably, at least 10%, or more preferably at least 15%, even more preferably at least 25%, or most preferably at least 35%, such as at least 50%, at least 75%, at least 90% or even 100% (w/w) of the grist of the wort is derived from malted grain.

The term "fermentation" means, in the context of brewing, the transformation of sugars in the wort, by enzymes in the brewing yeast, into ethanol and carbon dioxide with the formation of other fermentation by-products.

As used herein the term "malt" is understood as any malted cereal grain, such as barley.

The term "adjunct" is understood as the part of the grist which is not barley malt. The adjunct may be any carbohydrate rich material. In term "adjunct" includes the starch and/or sugar containing plant material obtained from cassava [*Manihot esculenta*] roots.

The term "mash" is understood as aqueous starch slurry, e.g. comprising crushed barley malt, crushed barley, and/or other adjunct or a combination hereof, mixed with water later to be separated into wort+spent grains.

As used herein, the term "wort" refers to the unfermented liquor run-off following extracting the grist during mashing.

As used herein, the term "spent grains" refers to the drained solids remaining when the grist has been extracted and the wort separated from the mash.

As used herein, the term "beer" refers to fermented wort, e.g. an alcoholic beverage brewed from barley malt, optionally adjunct and hops.

As used herein, the term "extract recovery" in the wort is defined as the sum of soluble substances extracted from the grist (malt and adjuncts) expressed in percentage based on dry matter.

As used herein, the term "pasteurisation" means the killing of micro-organisms in aqueous solution by heating. Implementation of pasteurisation in the brewing process is typically through the use of a flash pasteuriser or tunnel pasteuriser. As used herein, the term "pasteurisation units or PU" refers to a quantitative measure of pasteurisation. One pasteurisation unit (1 PU) for beer is defined as a heat retention of one minute at 60 degrees Celsius. One calculates that:

$$PU = t \times 1.393^{\wedge}(T-60), \text{ where:}$$

t=time, in minutes, at the pasteurisation temperature in the pasteuriser

T=temperature, in degrees Celsius, in the pasteuriser

[^(T−60) represents the exponent of (T−60)]

Different minimum PU may be used depending on beer type, raw materials and microbial contamination, brewer and perceived effect on beer flavor. Typically, for beer pasteurisation, of a lager beer 15-25 PU are required. Depending on the pasteurising equipment, pasteurisation temperatures are typically in the range of 64-72 degrees Celsius with a pasteurisation time calculated accordingly. Further information may be found in "Technology Brewing and Malting" by Wolfgang Kunze of the Research and Teaching Institute of Brewing, Berlin (VLB), 3rd completely updated edition, 2004, ISBN 3-921690-49-8.

As used herein, the term "DP1" (degree of polymerization 1) means glucose or fructose. "DP2" denotes maltose and/or isomaltose. "DP3" means maltotriose, panose and isopanose. "DP4/4+" means dextrin or maltooligosaccharides of a polymerization degree of 4 or higher which are unfermentable.

Where a range of values is provided, it is understood that each intervening value, to the tenth of the unit of the lower limit unless the context clearly dictates otherwise, between the upper and lower limits of that range is also specifically disclosed. Each smaller range between any stated value or intervening value in a stated range and any other stated or intervening value in that stated range is encompassed within the disclosure. The upper and lower limits of these smaller ranges may independently be included or excluded in the range, and each range where either, neither or both limits are included in the smaller ranges is also encompassed within the disclosure, subject to any specifically excluded limit in the stated range. Where the stated range includes one or both of the limits, ranges excluding either or both of those included limits are also included in the disclosure.

Before the exemplary embodiments are described in more detail, it is to be understood that this disclosure is not limited to particular embodiments described, as such may, of course, vary. Although any methods and materials similar or equivalent to those described herein can be used in the practice or testing of the present disclosure, exemplary methods, and materials are now described.

As used herein and in the appended claims, the singular forms "a", "an", and "the" include plural referents unless the context clearly dictates otherwise. Thus, for example, reference to "a gene" includes a plurality of such candidate agents and reference to "the cell" includes reference to one or more cells and equivalents thereof known to those skilled in the art, and so forth.

The publications discussed herein are provided solely for their disclosure prior to the filing date of the present application. Nothing herein is to be construed as an admission that the present disclosure is not entitled to antedate such publication by virtue of prior invention.

As used herein, "*Trichoderma reesei*" refers to a filamentous fungus of the phylum Ascomycota, subphylum Pezizomycotina. This organism was previously classified as *Trichoderma longibrachiatum*, and also as *Hypocrea jecorina*

Abbreviations

In the disclosure and experimental section which follows, the following abbreviations apply: GA (glucoamylase); GAU (glucoamylase unit); wt % (weight percent); ° C. (degrees Centigrade); rpm (revolutions per minute); $H_2O$ (water); $dH_2O$ (deionized water); aa or AA (amino acid); kD (kilodaltons); g or gm (grams); μg (micrograms); mg (milligrams); μL (microliters); ml and mL (milliliters); mm (millimeters); μm (micrometer); M (molar); mM (millimolar); μM (micromolar); U (units); V (volts); MW (molecular weight); sec(s) or s(s) (second/seconds); min(s) or m(s)

(minute/minutes); hr(s) or h(s) (hour/hours); ABS (Absorbance); EtOH (ethanol); and MTP (microtiter plate); N (Normal); ppm (parts per million).

DETAILED DESCRIPTION OF THE INVENTION

General

A look-up in the UniProt (http://www.uniprot.org/) database revealed only a single annotated glucoamylase [alpha-(1,4)-D-glucan glucohydrolase, EC 3.2.1.3, GA] (Coutinho and Reilly, 1997) gene entry for the following fungi: *Fusarium verticillioides*, *Aspergillus fumigatus* and *Trichoderma reesei* (see table 1).

TABLE 1

List of fungal glucoamylases
Glucoamylase

| Organism | Uniprot ID | SEQ ID. |
|---|---|---|
| *Fusarium verticillioides* | B0Z3Y3 | 1 |
| *Aspergillus fumigatus* | Q4WIT7 | 2 |
| *Trichoderma reesei* | G0R866 | 3 |

The major commercial application of glucoamylase is to catalyze starch saccharification to yield glucose for use in food and fermentation industries. Glucose production from starch, along with glucoamylase requires the synergistic action of a series of amylases. Additionally, debranching enzymes (pullulanase or isoamylase) are used to hasten starch processing by cleaving a-1,6 glycosidic bonds, which allows to attain an early peak in glucose yield with less byproduct formation (Reilly, 2006).

Industrial use of GAs confronts a major problem at high dissolved solids concentrations, here it does not yield all glucose, but instead condenses some of the glucose to various di-, tri-, and tetra-saccharides, where isomaltose [α-D-glucopyranosyl-(1→6)-D-glucose] previously was speculated to be the most important of them (Reilly, 1999). Previously also Ford et al. (1998) successfully showed increased GA selectivity and glucose yield by a series of single and multiple site-directed mutations in the GA catalytic domain. The aim was to modify the dimensions of the active site just enough to make it difficult to bind isomaltose, the speculated most prevalent by product, while not affecting the binding of maltose. This, however also resulted in lowering the specific catalytic efficiency for α-1,6 glyosidic bonds important for the starch processing.

Besides iso-maltose many other non-fermentable smaller saccharides may be formed by enzymatic reversion such as: panose, nigerose, kojibiose, isomaltotriose, isomaltotetraose, isomaltopentaose, In the present application inventors propose the use of several GA's with inherent different specificity to obtain synergistically high catalytic efficiency and low level of residual non-fermentable sugars. Glucoamylases from different sources is known to have various degree of condensation and specificity. As shown by present inventors the right combination of glucoamylase with different specificity may lower the total sum of non-fermentable sugars, including enzymatically produced condensation products such as, iso-maltose, panose, nigerose, kojibiose, isomaltotriose and so forth. Lowering the amount of non-fermentable sugars may result in production of even higher attenuated beers. In brewing, attenuation is the percentage that measures the conversion of sugars into alcohol and carbon dioxide by the fermentation process; a more attenuated beer will generally be drier and more alcoholic than a less attenuated beer made from the same wort. This may also be expressed in the brewing term RDF, real degree of fermentation. RDF measures the degree to which sugar in wort has been fermented into alcohol in beer, defined as attenuation. The higher the RDF percentage, the lighter and drier the beer. As seen from examples 6 in the present application there is a very good correlation between the obtained DP1% and resulting RDF.

Recently, there has been a widespread popularization of brewed beverages called light beers, reduced calorie beers or low-calorie beers, particularly in the U.S. market. As defined in the U.S., these beers have 50% or fewer calories than a manufacturer's "normal" beer.

As used herein, the term "light beers, reduced calorie beers or low-calorie beers", refers to the recent, widespread popularization of brewed beverages, particularly in the U.S. market. As defined in the U.S., these highly attenuated beers have approximately 50% fewer calories than a manufacturer's "normal" beer." Further information on conventional brewing processes may be found in "Technology Brewing and Malting" by Wolfgang Kunze of the Research and Teaching Institute of Brewing, Berlin (VLB), 3rd completely updated edition, 2004, ISBN 3-921690-49-8.

Several types of ultra-light beers have less than 80 kilocalories (per 12 oz.), such as Budweiser Select 55, Miller Genuine Draft 64. Reducing the non-fermentable sugars further in mashing, will enable fermentations to higher RDF and production of even higher attenuated beer, with less calories.

In accordance with an aspect of the present invention, it has been discovered that a brewer's wort with high percentage of fermentable DP1 sugar can be produced using combination of glucoamylases. In accordance with an aspect of the present invention, a method is presented for producing a brewer's wort having increased DP1 sugar having the steps of adding to a mash comprising a grist a first glucoamylase and a second glucoamylase wherein the first glucoamylase is not the same as the second glucoamylase to produce the brewer's wort.

Preferably, the first and the second glucoamylase are obtained from a filamentous fungus. More preferably, the filamentous fungus is selected from the group consisting of *Acremonium, Agaricus, Alternaria, Aspergillus, Aureobasidium, Botryosphaeria, Ceriporiopsis, Chaetomidium, Chrysosporium, Claviceps, Cochliobolus, Coprinopsis, Coptotermes, Corynascus, Cryphonectria, Cryptococcus, Diplodia, Exidia, Filibasidium, Fusarium, Gibberella, Holomastigotoides, Humicola, Irpex, Lentinula, Leptosparia, Magnaporthe, Melanocarpus, Meripilus, Mucor, Myceliophthora, Neocallimastix, Neurospora, Paecilomyces, Penicillium, Phanerochaete, Piromyces, Poitrasia, Pseudoplectania, Pseudotrichonympha, Rhizomucor, Schizophyllum, Scytalidium, Talaromyces, Thermoascus, Thielavia, Tolypocladium, Trichoderma, Trichophaea, Verticillium, Volvariella,* and *Xylaria*.

In still more preferred aspects of the present invention, the first and second glucoamylases are from different filamentous fungi. Preferably, the filamentous fungus is selected from the group consisting of *Acremonium cellulolyticus, Aspergillus aculeatus, Aspergillus awamori, Aspergillus fumigatus, Aspergillus foetidus, Aspergillus japonicus, Aspergillus nidulans, Aspergillus niger, Aspergillus oryzae, Chrysosporium keratinophilum, Chrysosporium lucknowense, Chrysosporium tropicum, Chrysosporium merdarium, Chrysosporium inops, Chrysosporium pannicola, Chrysosporium queenslandicum, Chrysosporium zonatum,*

Fusarium bactridioides, Fusarium cerealis, Fusarium crookwellense, Fusarium culmorum, Fusarium graminearum, Fusarium graminum, Fusarium heterosporum, Fusarium negundi, Fusarium oxysporum, Fusarium reticulatum, Fusarium roseum, Fusarium sambucinum, Fusarium sarcochroum, Fusarium sporotrichioides, Fusarium sulphureum, Fusarium torulosum, Fusarium trichothecioides, Fusarium venenatum, Humicola grisea, Humicola insolens, Humicola lanuginosa, Irpex lacteus, Mucor miehei, Myceliophthora thermophila, Neurospora crassa, Penicillium funiculosum, Penicillium purpurogenum, Phanerochaete chrysosporium, Penicillium thomii, Penicillium oxalicum, Thielavia achromatica, Thielavia albomyces, Thielavia albopilosa, Thielavia australeinsis, Thielavia fimeti, Thielavia microspora, Thielavia ovispora, Thielavia peruviana, Thielavia spededonium, Thielavia setosa, Thielavia subthermophila, Thielavia terrestris, Trichoderma harzianum, Trichoderma koningii, Trichoderma longibrachiatum, Trichoderma reesei, or Trichoderma viride. Still more preferably, the filamentous fungus is selected from the group consisting of Aspergillus fumigatus, Fusarium venenatum, and Trichoderma reesei.

In yet another aspect of the present invention, the first and/or the second glucoamylases are variants of a glucoamylase derived from a filamentous fungus. Preferably, the variant glucoamylases are derived from Aspergillus fumigatus, Fusarium venenatum, and Trichoderma reesei. Still more preferably, the variant glucoamylase is derived from Trichoderma reesei.

In another preferred aspect of the present invention, the first and second glucoamylase have 60% or less sequence identity. More preferably, the first and second glucoamylase have 58% or less sequence identity. Still more preferably, the first and second glucoamylase have 56% or less sequence identity. Still more preferably, the first and second glucoamylase have 54% or less sequence identity. Still more preferably, the first and said second glucoamylase have 52% or less sequence identity. In a still more preferred aspect of the present invention the first and second glucoamylase have 50% or less sequence identity.

In another aspect of the present invention, the first and second glucoamylases are selected from the group consisting of a Fusarium venenatum glycoamylase as set forth in SEQ ID NO: 1 (FvGA) or a sequence having at least 80% identity thereto, a Aspergillus fumigatus glucoamylase as set forth in SEQ ID NO: 2 (AfuGA) or a sequence having at least 80% identity thereto, a Trichoderma reesei glucoamylase as set forth in SEQ ID NO: 3 (TrGA) or a sequence having at least 80% identity thereto, a first Trichoderma reesei variant glucoamylase as set forth in SEQ ID NO: 4 (TrGA_var1) or a sequence having at least 80% identity thereto and a second Trichoderma reesei variant glucoamylase as set forth in SEQ ID NO: 5 TrGA_var2 or a sequence having at least 80% identity thereto.

More preferably, the first and second glucoamylases are selected from the group consisting of FvGA as set forth in SEQ ID NO: 1 or a sequence having at least 90% identity thereto, AfuGA as set forth in SEQ ID NO: 2 or a sequence having at least 90% identity thereto, TrGA as set forth in SEQ ID NO: 3 or a sequence having at least 90% identity thereto, TrGA_var1 as set forth in SEQ ID NO: 4 or a sequence having at least 90% identity thereto and TrGA_var2 as set forth in SEQ ID NO: 5 or a sequence having at least 90% identity thereto.

Till more preferably, the first and second glucoamylases are selected from the group consisting of FvGA as set forth in SEQ ID NO: 1 or a sequence having at least 95% identity thereto, AfuGA as set forth in SEQ ID NO: 2 or a sequence having at least 95% identity thereto, TrGA as set forth in SEQ ID NO: 3 or a sequence having at least 95% identity thereto, TrGA_var1 as set forth in SEQ ID NO: 4 or a sequence having at least 95% identity thereto and TrGA_var2 as set forth in SEQ ID NO: 5 or a sequence having at least 95% identity thereto. 17. The method of claim 16 wherein said first and second glucoamylases are selected from the group consisting of FvGA as set forth in SEQ ID NO: 1 or a sequence having at least 99% identity thereto, AfuGA as set forth in SEQ ID NO: 2 or a sequence having at least 99% identity thereto, TrGA as set forth in SEQ ID NO: 3 or a sequence having at least 99% identity thereto, TrGA_var1 as set forth in SEQ ID NO: 4 or a sequence having at least 99% identity thereto and TrGA_var2 as set forth in SEQ ID NO: 5 or a sequence having at least 99% identity thereto In still more preferred aspects of the present invention, the first and second glucoamylases are selected from the group consisting of FvGA as set forth in SEQ ID NO: 1, AfuGA as set forth in SEQ ID NO: 2, TrGA as set forth in SEQ ID NO: 3, TrGA_var1 as set forth in SEQ ID NO: 4 and TrGA_var2 as set forth in SEQ ID NO: 5. In yet more preferred aspects of the present invention, the first and said second glucoamylases are other than TrGA and TrGA_var1, TrGA_var1 and TrGA_var2 or TrGA and TrGA_var2. In still a more preferred aspect of the present invention, the first and said second glucoamylases comprise TrGA and FvGA, AFuGA and FvGA, TrGA and AFuGA or TrGA_var2 and FvGA.

In another aspect of the present invention, the first and said second glucoamylases have a predetermined ratio. Preferably, the first and second glucoamylases are TrGA and FvGA having a mass ratio of about 3:2 or greater. More preferably, the mass ratio is about 4:1. In another preferred embodiment, the first and second glucoamylases are AfuGA and FvGA having a mass ratio of about 3:2 or greater. More preferably, the mass ratio is about 4:1. In another preferred embodiment, the first and second glucoamylases are TrGA_var2 and FvGA having a mass ratio of about 3:2 or greater. More preferably, the mass ratio is about 4:1. In yet another preferred embodiment, the first and second glucoamylases are TrGA and AFuGA having a mass ratio of about 1:1 or less. More preferably, the mass ratio is about 2:3.

In another preferred aspect of the present invention, the method for producing a brewer's wort having increase DP1, further comprises adding an enzyme selected from the group consisting of a pullulanase, a protease, a xylanase, a lipase, a cellulase, an amylase, a third glucoamylase and a beta glucanase. Preferably, the third glucoamylase is different than the first and second glucoamylases described herein. More preferably, the first glycoamylase is a Fusarium venenatum glycoamylase as set forth in SEQ ID NO: 1 (FvGA) or a sequence having at least 80% identity thereto, the second glucoamylase is an Aspergillus fumigatus glucoamylase as set forth in SEQ ID NO: 2 (AfuGA) or a sequence having at least 80% identity thereto, and the third glycoamylase is a Trichoderma reesei variant glucoamylase as set forth in SEQ ID NO: 4 (TrGA_var1) or a sequence having at least 80% identity thereto. Still more preferably, the first glycoamylase is FvGa, the second glucoamylase is AfuGA and the third glucoamylase is TrGA_var1

In another aspect of the present invention, the brewer's wort has less than about 4% DP4/4+. More preferably, the brewer's wort has less than about 3.8% DP4/4+. Still more preferably, the brewer's wort has less than about 3.5%

DP4/4+. In the most preferred aspect of the present invention, the brewer's wort has about 3% DP4/4+.

In still another aspect of the present invention, the grist contains malt. More preferably, the grist further comprises corn, rice, sorghum, barley, wheat, rye, oats or tapioca or mixtures thereof.

In still another aspect of the present invention, the brewer's wort has about 93% or greater DP1. More preferably, the brewer's wort has about 94% or greater DP1.

In still another aspect of the present invention, the method further comprises fermenting the brewer's wort to produce a beer. Preferably, the beer has an RDF of greater than 84%. Still more preferably, the beer has an RDF of greater than 85%. Still more preferably, the beer has an RDF of greater than 86%. Still more preferably, the beer has an RDF of greater than 87%. Still more preferably, the beer has an RDF of greater than 88%. Still more preferably, the beer has an RDF of greater than 89%.

To be effective in the instantly claimed invention, the glucoamylase should be chosen such that it retains sufficient activity at the process temperatures of the claimed process and retain sufficient activity under the moderately acidic pH conditions of a typical mash. In addition, the glucoamylases must be employed in sufficient quantity to be effective in accordance with the present invention.

In accordance with the present invention, glucoamylases can be produced directly from the organism giving in which they naturally reside. Alternatively, common techniques of molecular biology may be employed to clone the gene sequence corresponding to the glucoamylase and then to inserted into an organism for heterologous expression. Glucoamylases (GAs) are produced by numerous strains of bacteria, fungi, yeast and plants. Many fungal glucoamylases are secreted from the cell, for example from strains of *Aspergillus* (Svensson et al., Carlsberg Res. Commun. 48: 529-544 (1983); Boel et al., EMBO J. 3: 1097-1102 (1984); Hayashida et al., Agric. Biol. Chem. 53: 923-929 (1989); U.S. Pat. Nos. 5,024,941; 4,794,175 and WO 88/09795); *Talaromyces* (U.S. Pat. Nos. 4,247,637; 6,255,084; and 6,620,924); *Rhizopus* (Ashikari et al., Agric. Biol. Chem. 50: 957-964 (1986); Ashikari et al., App. Microbio. Biotech. 32: 129-133 (1989) and U.S. Pat. No. 4,863,864); *Humicola* (WO 05/052148 and U.S. patent No. The isolation, cloning and expression of the TrGA are described in WO 2006/060062 and U.S. Pat. No. 7,413,887, similar procedures may be used to construct heterologous GA expression hosts of other fungal origin.

In an aspect of the present invention, the concentration of glucoamylase added is between about 0.01 mg to about 2.0 mg per gram of total grist. More preferably, the concentration of glucoamylase added is between about 0.1 mg to about 0.5 mg per gram of total grist.

The present disclosure is described in further detail in the following examples, which are not in any way intended to limit the scope of the disclosure as claimed. The attached figures are meant to be considered as integral parts of the specification and description of the disclosure. The following examples are offered to illustrate, but not to limit the claimed disclosure.

Example 1—Production of Glucoamylases in *Trichoderma reesie*

Production of TrGA and variants hereof in *Trichoderma reesie* may essential be carried out described previously in WO2014029808. Heterologous expression of FvGA and AfuGA may be carried as previously described for MkGA in WO2013092840. Culturing *Trichoderma reesie* for glucoamylase expression may be carried essential as described below:

400× Trace Element Solution:

Dilute in 1000 ml of demi water: Anhydrous Citric Acid (175 g), $FeSO_4*7H_2O$ (200 g), $ZnSO_4*7H_2O$ (16 g), $CuSO_4*5H_2O$ (3.2 g), $MnSO_4*H_2O$ (1.4 g), $H_3BO_3$ (0.8 g). It may be helpful to acidify this to get all components into solution. The solution was filtered and sterilized.

LD-Medium:

Add to ~800 ml of demi water: Casamino acids (9 g), $MgSO_4*7H_2O$ (1 g), $(NH_4)_2SO_4$ (5 g), $KH_2PO_4$ (4.5 g), $CaCl_2)*2H_2O$ (1 g), Piperazine-1,4-bis-propanesulfonic acid (PIPPS) buffer (33 g), 400× *T. reesei* trace elements (2.5 ml), Adjust pH to 5.5 with NaOH 4N. Adjust final volume to 920 ml.

2×Amd S Base ager (1 Litre):

Mix $KH_2PO_4$ (30 g), 1M Acetamide (20 ml), 1M CsCl (20 ml), 20% $MgSO_4.7H_2O$ (6 ml), 20% $CaCl_2.2H_2O$ (6 ml), *T. reesei* spore elements 400× (2 ml), 50% $glucose.H_2O$ (80 ml). Adjust pH to 4.5 with 4N NaOH Make up to 1 L and filter sterilize. Store at 4° C.

Initial Culture:

*Trichoderma reesei* strains were grown on AmdS-Base agar plates. To produce agar plates minimal media agar was boiled and after cooling down to app. 50° C. it was diluted with 2× AmdS Base 1:1 and poured on petri dishes. After sporulation (app. 6-7 days) the plates were scraped with 2 ml saline 0.015% Tween 80. Approx 1 ml was added to glycerol tubes containing 500-600 µl 35% glycerol and stored at −80° C. The pre-culture fermentations were started directly from this spore suspension.

Pre Culture:

The medium is made by adding 2.5% glucose to the LD-medium, which is subsequently made up to 1 L. To produce biomass 50 µl spore suspension is added to 100 ml medium (sterilised in 500 ml shake flask). The flasks are incubated on a rotary shaker at 30° C., 180 rpm for 2 days, then 10 ml suspension is used to inoculate a new baffled shake flask, which is incubated under similar conditions for 1 day. The content of this flask is used to inoculate a fermentor. Alternatively, fermentation of the pre-culture was initiated by a piece (~1 $cm^2$) of a fresh PDA plate with *T. reesei*.

Main Culture:

To make 1 L of medium, 40 ml glucose/sophorose mix (Danisco, Jamsa, Finland) was added to the LD-medium and made up to 1 L. 6 L fermentors containing 4 L of medium were inoculated with the pre-culture, and grown at pH 3.5 for approximately 16 hours at 34° C., until CER/OUR (Carbondioxide Excretion Rate/Oxygen Uptake Rate) started falling. Then temperature was lowered to 28° C., pH was raised to 5.5 and the fermentation was continued for approximately 80 hours. The cell culture is harvested and media clarified by centrifugation (4000 rpm at 25 min.) and filtration (VacuCap 90, 0.2 µm). Following, the ferment was concentrated and stored at −20° C.

Example 2—Protein Determination Methods

Protein Determination by Stain Free Imager Criterion

Protein was quantified by SDS-PAGE gel and densitometry using Gel Doc™ EZ imaging system. Reagents used in the assay: Concentrated (2×) Laemmli Sample Buffer (Bio-Rad, Catalogue #161-0737); 26-well XT 4-12% Bis-Tris Gel (Bio-Rad, Catalogue #345-0125); protein markers "Precision Plus Protein Standards" (Bio-Rad, Catalogue #161-

0363); protein standard BSA (Thermo Scientific, Catalogue #23208) and SimplyBlue Safestain (Invitrogen, Catalogue # LC 6060. The assay was carried out as follow: In a 96 well-PCR plate 504, diluted enzyme sample were mixed with 50 µL sample buffer containing 2.7 mg DTT. The plate was sealed by Microseal 'B' Film from Bio-Rad and was placed into PCR machine to be heated to 70° C. for 10 minutes. After that the chamber was filled by running buffer, gel cassette was set. Then 10 µL of each sample and standard (0.125-1.00 mg/mL BSA) was loaded on the gel and 5 µL of the markers were loaded. After that the electrophoresis was run at 200 V for 45 min. Following electrophoresis the gel was rinsed 3 times 5 min in water, then stained in Safestain overnight and finally destained in water. Then the gel was transferred to Imager. Image Lab software was used for calculation of intensity of each band. By knowing the protein amount of the standard sample, the calibration curve can be made. The amount of sample can be determined by the band intensity and calibration curve. The protein quantification method was employed to prepare samples of glucoamylase enzyme used for assays shown in subsequent Examples.

Example 3—Sugar Analysis by HPLC

All standards: Glucose, Maltose, Maltotriose and Maltotetraose were prepared in double distilled water (ddH2O) and filtered through 0.45 µm syringe filters. A set of each standard was prepared ranging in concentration from 10 to 100,000 ppm.

All wort samples containing active enzymes were inactivated by heating the sample to 95° C. for 10 min. Subsequently wort samples were prepared in 96 well MTP plates (Corning, N.Y., USA) and diluted minimum 4 times in ddH2O and filtered through 0.20 µm 96 well plate filters before analysis (Corning filter plate, PVDF hydrophile membrane, NY, USA). All samples were analyzed in duplicates.

Instrumentation

Quantification of sugars: DP1, DP2, DP3, DP4 and DP5+ were performed by HPLC. Analysis of samples was carried out on a Dionex Ultimate 3000 HPLC system (Thermo Fisher Scientific) equipped with a DGP-3600SD Dual-Gradient analytical pump, WPS-3000TSL thermostated autosampler, TCC-3000SD thermostated column oven, and a RI-101 refractive index detector (Shodex, JM Science). Chromeleon datasystem software (Version 6.80, DU10A Build 2826, 171948) was used for data acquisition and analysis.

Chromatographic Conditions

The samples were analyzed using a RSO oligosaccharide column, $Ag^+$ 4% crosslinked (Phenomenex, The Netherlands) equipped with an analytical guard column (Carbo-$Ag^+$ neutral, AJ0-4491, Phenomenex, The Netherlands) operated at 70° C. The column was eluted with double distilled water (filtered through a regenerated cellulose membrane of 0.45 µm and purged with helium gas) at a flow rate of 0.3 ml/min. Isocratic flow of 0.3 ml/min was maintained throughout analysis with a total run time of 45 min and injection volume was set to 10 µL. Samples were held at 20° C. in the thermostated autosampler compartment. The eluent was monitored by means of a refractive index detector (RI-101, Shodex, JM Science) and quantification was made by the peak area relative to the peak area of the given standard (DP1: glucose; DP2: maltose; DP3: maltotriose and peaks with a degree of four or higher maltotetraose was used as standard).

Example 4—Pairwise Application of Glucoamylases for Increased Wort Saccharification Mashing Operation for Wort Production Glucoamylases was tested in mashing operation with 55% Pilsner malt (Pilsner malt; Fuglsang Denmark, Batch 13 Jan. 2016) and 45% Corn grits (Nordgetreide GmBH Lübec, Germany, Batch: 2 May 2016), using a water to grist ratio of 3.8:1. Pilsner malt was milled at a Buhler Miag mill (0.5 mm setting).

The corn adjunct was liquefied in the follow way: corn grits (31.5 g), Malt (milled pilsner malt, 5.5 g) and tap water (141 g) was mixed in mashing bath (Lockner, LG-electronics) cups and pH adjusted to pH 5.4 with 2.5M sulphuric acid. The adjunct was mashed with the program; heated to 43° C. and kept for 1 minute for mashing in; heated to 72° C. for 14.5 minutes by increasing temperature with 2° C./minute; kept at 72° C. for 5 minutes; heated to 74° C. for 1 minute by increasing temperature with 2° C./minute; kept at 74° C. for 2 minutes; heated to 76° C. for 1 minute by increasing temperature with 2° C./minute; kept at 76° C. for 2 minutes; heated to 78° C. for 1 minute by increasing temperature with 2° C./minute; kept at 78° C. for 2 minutes. heated to 80° C. for 1 minute by increasing temperature with 2° C./minute; kept at 80° C. for 5 minutes; heated to 95° C. for 7.5 minutes by increasing temperature with 2° C./minute; kept at 95° C. for 15 minutes and mashing off. Hereafter the adjunct was cooled to 64° C. and combined with the main mash. In the main mash, malt (milled pilsner malt, 122 g) and tap water (122 g) was mixed in a mashing bath (Lochner, LG-electronics) cup and pH adjusted to pH 5.4 with 2.5M sulphuric acid. The main mash was heated to 43° C. by increasing temperature with 2° C./minute; kept at 43° C. for 10 minutes and heated to 64° C. for 21 minutes by increase temperature with 1° C./minute. The adjunct and main mash was combined and substrate was aliquoted out in 15.0 g samples (in small wheaton glass containers with cap) to continue the mashing with enzyme addition.

After enzyme addition in the 15 g sample mashing was continued in dry bath at 64° C. with magnetic stirring for 240 minutes, followed by heating to 79° C. (held for 15 minutes) and sugar analysis was carried out by HPLC as described in example 3.

Five different glucoamylases were tested in different pairwise combinations: TrGA (*Trichoderma reesie*, glucoamylase), TrGA_variant 1 (protein engineered variant of *Trichoderma reesie*, glucoamylase including the mutations L417V, T430A, Q511H, A539R and N563I), TrGA_variant 2 (protein engineered variant of *Trichoderma reesie*, glucoamylase including the mutations D44R and A539R), AfuGA (*Aspergillus fumigatus*, glucoamylase) and FvGA (*Fusarium verticillioides*, glucoamylase).

The following glucoamylase dose was used to obtain a conversion of starch into approximate 93% DP1 (e.g. glucose and fructose).

TABLE 2

Concentration in ppm of GA in mash application
to obtain 93% DP1 conversion

|  | TrGA | TrGA_variant 1 | TrGA_variant 2 | AfuGA | FvGA |
|---|---|---|---|---|---|
| ppm GA in application | 74.7 | 78.4 | 173.8 | 60.4 | 120.9 |

The five glucoamylases were mixed in all 10 unique pairwise combinations: TrGA_variant 2:TrGA_variant 1, TrGA_variant 2:TrGA, TrGA_variant 2:AfuGA, TrGA_variant 2:FvGA, TrGA_variant 1:TrGA, TrGA_variant 1:AfuGA, TrGA_variant 1:FvGA, TrGA:AfuGA, TrGA:FvGA and AfuGA:FvGA. Furthermore, varying pair ratios were applied ranging: [10:0], [8:2], [6:4], [5:5], [4:6], [2:8] and [0:10]. Thus, A mix of AfuGA:FvGA [6:4] would equal 0.6×60.4 ppm AfuGA+0.4×120.9 ppm FvGA in application. The following relative % of DP1 released after mashing by applying all 10 unique pairwise combinations with the 7 different ratios is shown in table 3.

TABLE 3

Relative concentration in % of DP1after mashing 240 minutes at 64 C. Values are normalized to the relative DP1 concentration obtained by the single glucoamylases, e.g. [10:0] and [0:10] in each mix, which is set to 93%. Normalization of value obtained by two glucoamylases are weighted by the relative ratio in the mix.

|  | GA1:GA2 | | | | | | |
|---|---|---|---|---|---|---|---|
|  | [10:0] | [8:2] | [6:4] | [5:5] | [4:6] | [2:8] | [0:10] |
| TrGA var 2:TrGA | 93.00 | 93.04 | 92.96 | 92.97 | 92.97 | 93.20 | 93.00 |
| TrGA var 1:TrGA | 93.00 | 93.09 | 93.16 | 92.64 | 93.00 | 92.72 | 93.00 |
| TrGA var 2:TrGA var 1 | 93.00 | 92.91 | 93.31 | 93.11 | 92.95 | 93.28 | 93.00 |
| TrGA var1:FvGA | 93.00 | 93.30 | 93.67 | 93.45 | 93.56 | 93.49 | 93.00 |
| TrGA var1:AfuGA | 93.00 | 93.56 | 93.30 | 93.88 | 93.74 | 93.52 | 93.00 |
| TrGA var2:AfuGA | 93.00 | 93.28 | 93.61 | 93.83 | 93.70 | 93.54 | 93.00 |
| TrGA:AfuGA | 93.00 | 93.30 | 93.79 | 93.62 | 93.99 | 93.65 | 93.00 |
| TrGA:FvGA | 93.00 | 94.16 | 93.90 | 93.68 | 94.01 | 93.91 | 93.00 |
| AfuGA:FvGA | 93.00 | 94.32 | 93.83 | 93.72 | 93.54 | 93.43 | 93.00 |
| TrGA var2:FvGA | 93.00 | 94.63 | 94.23 | 93.75 | 93.36 | 93.13 | 93.00 |

The relative concentration of DP1 after mashing 240 minutes at 64° C. is normalized to the concentration obtained by the single glucoamylases alone (93%) for better evaluation of potential pairwise synergies by glucoamylase pairs. As seen from the relative part of DP1 released in table 3, the use of a single glucoamylase resulted in 93% DP1, whereas the vast majority of glucoamylase pairs resulted in a higher DP1 release when combined. This may be explained as a positive synergy between two different GA, increasing DP1. Only 7 specific combinations out the 50 tested lowered DP1 produced, whereas 1 was unchanged and the remaining increased DP1. Thus, several pairs of the different glucoamylases showed synergy, with an increased DP1 released (as high as 94.63% obtained by TrGA var 2:FvGA [8:2]). Notably, higher DP1 release was obtained in all pairs including either AfuGA or FvGA, whereas a lower increase was obtained combining TrGA with either TrGA variant 1 or 2 in any of the tested combinations. The latter showed for some pairs a decreased DP1 release (<93%). Thus it's obvious that more effective release of DP1 during mashing may be accomplished by applying the right combination of two glucoamylases compared to applying one glucoamylase.

Example 5—AfuGA and FvGA for Increased Wort Saccharification

The AfuGA (*Aspergillus fumigatus*, glucoamylase) and FvGA (*Fusarium verticillioides*, glucoamylase) were tested in the setup described in example 4 for increased wort saccharification. Dose-response experiments of the two glucoamylases were performed individually together with a dose-response of a 1:1 molar mix of AfuGA and FvGA (termed 1:1 AfuGA:FvGA). Glucoamylases were dosed based on the total amount of GA in the mashing. The following concentrations were applied: AfuGA [0 ppm, 26 ppm, 52 ppm, 65 ppm, 78 ppm, 93 ppm], FvGA [0 ppm, 29 ppm, 58 ppm, 73 ppm, 88 ppm] and 1:1 AfuGA:FvGA [0 ppm, 20 ppm, 30 ppm, 40 ppm, 50 ppm, 60 ppm, 70 ppm, 80 ppm]. The relative concentration of DP1 (of all sugars) after mashing 240 minutes at 64° C. is shown in FIG. 1 for the three GA preparations.

FIG. 1 shows that it's possible to obtain a relative higher concentration of DP1 sugar in the mash by the addition of both FvGA and AfuGA together than what can be achieved by the two glucoamylase individually. In addition, the combination of the two glucoamylases enables a certain DP1 concentration by a lower total glucoamylase dosage compared to the DP1 concentration achieved by two glucoamylases individually.

Example 6—Application of Single and Pairwise Glucoamylases in Brew Analysis with Determination of Real Degree of Fermentation (RDF)

Glucoamylases was tested in mashing operation with 55% Pilsner malt (Pilsner malt; Fuglsang Denmark, Batch 13 Jan. 2016) and 45% Corn grits (Nordgetreide GmBH Lubec, Germany, Batch: 2 May 2016), using a water to grist ratio of 3.8:1. Pilsner malt was milled at a Buhler Miag mill (0.5 mm setting).

The corn adjunct was liquefied in the follow way: Corn grits (31.5 g), Malt (milled pilsner malt, 5.5 g) and tap water (141 g) was mixed in mashing bath (Lockner, LG-electronics) cups and pH adjusted to pH 5.4 with 2.5M sulphuric acid. The adjunct was mashed with the program; heated to 43° C. and kept for 1 minute for mashing in; heated to 72° C. for 14.5 minutes by increasing temperature with 2° C./minute; kept at 72° C. for 5 minutes; heated to 74° C. for 1 minute by increasing temperature with 2° C./minute; kept at 74° C. for 2 minutes; heated to 76° C. for 1 minute by increasing temperature with 2° C./minute; kept at 76° C. for 2 minutes; heated to 78° C. for 1 minute by increasing temperature with 2° C./minute; kept at 78° C. for 2 minutes. heated to 80° C. for 1 minute by increasing temperature with 2° C./minute; kept at 80° C. for 5 minutes; heated to 95° C. for 7.5 minutes by increasing temperature with 2° C./minute; kept at 95° C. for 15 minutes and mashing off. Hereafter the adjunct was cooled to 64° C. and combined with the main mash. In the main mash, malt (milled pilsner malt, 122 g) and tap water (122 g) was mixed in a mashing bath (Lochner, LG-electronics) cup and pH adjusted to pH 5.4 with 2.5M sulphuric acid.

The main mash was heated to 43° C. by increasing temperature with 2° C./minute; kept at 43° C. for 10 minutes and heated to 64° C. for 21 minutes by increase temperature with 1° C./minute. Thus, to each cup with 178 g adjunct (liquefied corn, malt and water) enzymes where added when temperature reached 64° C. Following the mash where held at 64° C. for 240 minutes followed by a ramp to 79° C. by 1° C./minute. The mash was finally held at 79° C. for 15 min. Iodine negative was tested when temperature had reached 72° C. The time in minutes that was required to get iodine negative was noted.

At the end of mashing, the mashes were made up to 350 g and filtered. Filtrate volumes were measured after 30 minutes. The pH was adjusted to pH 5.2 with 2.5 M sulphuric acid and one pellet of bitter hops from Hopfenveredlung, St. Johann: Alpha content of 16.0% (EBC 7.70 specific HPLC analysis, 1 Oct. 2013), was added to each flask (210 g). The wort samples were boiled for 60 minutes in a boiling bath and wort were cooled down to 17° C. and filtered. 100 g of each wort was weighted out into a 500 ml conical flask for fermentation adding 0.5% W34/70 (Weihenstephan) freshly produced yeast (0.50 g) to the wort having 17° C. The remaining of the filtered wort was used for analysis, see below. The wort samples were fermented at 18° C. and 150 rpm after yeast addition. Analysis was performed when fermentation had finished.

The following combinations of glucoamylase enzymes were tested: 50 ppm AfuGA, 50 ppm FvGA, 50 ppm TrGA_var1, 50 ppm TrGA, 25 ppm AfuGA+25 ppm FvGA, 25 ppm AfuGA+25 ppm TrGA_var1, 25 ppm FvGA+25 ppm TrGA_var1 and 25 ppm TrGA_var1+25 ppm TrGA.

In this experiment, the dosage of glucoamylase was constant at 50 ppm independent on addition of one or the blend of two glucoamylases.

Wort analysis: Original Extract (OE), Extract in the wort samples after mashing was measured using Anton Paar (Lovis) following Dupont Standard Instruction Brewing, 23.8580-B28Fermentable sugars (% total+g/100 ml) by HPLC were DP1, DP2, DP3 and DP4+ was determined after mashing following Dupont Standard Instruction Brewing, 23.8580-B20.

Beer analysis: RDF was measured using an Anton Paar (DMA 5000) following Standard Instruction Brewing, 23.8580-B28 and alcohol by Dupont Standard Instruction Brewing, 23.8580-B28.

Real degree of fermentation (RDF) value may be calculated according to the equation below:

$$RDF(\%) = \left(1 - \frac{RE}{°P_{initial}}\right) \times 100$$

Where: RE=real extract=$(0.1808 \times °P_{initial}) + (0.8192 \times °P_{final})$, $°P_{initial}$ is the specific gravity of the standardised worts before fermentation and $°P_{final}$ is the specific gravity of the fermented worts expressed in degree Plato.

In the present context, Real degree of fermentation (RDF) was determined from the specific gravity and alcohol concentration.

Specific gravity and alcohol concentration was determined on the fermented samples using a Beer Alcolyzer Plus and a DMA 5000 Density meter (both from Anton Paar, Gratz, Austria). Based on these measurements, the real degree of fermentation (RDF) value was calculated according to the equation below:

$$RDF(\%) = \frac{OE - E(r)}{OE} \times 100$$

Where: E(r) is the real extract in degree Plato (°P) and OE is the original extract in °P.

Original Extract (OE) Extract in the beer samples after mashing was measured using an Anton Paar (DMA 5000) following Dupont Standard Instruction Brewing, 23.8580-B28.

The result of HPLC and extract analysis of the wort after saccharification by different glucoamylases are shown in table 4. The relative sugar composition in the wort is shown in table 5.

TABLE 4

HPLC and original extract analysis of wort composition

| | average g per 100 ml | | | | | |
|---|---|---|---|---|---|---|
| | DP1 | DP2 | DP3 | DP4+ | Total Sugar | OE (° P) |
| AfuGA (50 ppm) | 15.84 | 0.32 | 0.12 | 0.74 | 17.04 | 15.82 |
| FvGA (50 ppm) | 17.27 | 0.57 | 0.23 | 0.84 | 18.91 | 16.94 |
| TrGA_var1 (50 ppm) | 17.17 | 0.56 | 0.12 | 0.68 | 18.53 | 16.81 |
| TrGA (50 ppm) | 17.00 | 0.43 | 0.14 | 0.97 | 18.54 | 16.90 |
| AfuGA (25 ppm) + FvGA (25 ppm) | 17.49 | 0.34 | 0.17 | 0.60 | 18.60 | 16.94 |
| AfuGA (25 ppm) + TrGA_var1 (25 ppm) | 16.01 | 0.41 | 0.10 | 0.58 | 17.10 | 15.66 |
| FvGA (25 ppm) + TrGA_var1 (25 ppm) | 17.32 | 0.44 | 0.11 | 0.56 | 18.43 | 16.79 |
| TrGA_var1 (25 ppm) + TrGA (25 ppm) | 14.82 | 0.40 | 0.10 | 0.61 | 15.94 | 14.72 |

TABLE 5

Relative distribution of sugars from HPLC analysis of wort

| | average % | | | |
|---|---|---|---|---|
| | DP1 | DP2 | DP3 | DP4+ |
| AfuGA (50 ppm) | 93.0 | 1.9 | 0.7 | 4.4 |
| FvGA (50 ppm) | 91.3 | 3.0 | 1.2 | 4.4 |
| TrGA_var1 (50 ppm) | 92.7 | 3.0 | 0.6 | 3.7 |
| TrGA (50 ppm) | 91.7 | 2.3 | 0.7 | 5.2 |
| AfuGA (25 ppm) + FvGA (25 ppm) | 94.1 | 1.8 | 0.9 | 3.2 |
| AfuGA (25 ppm) + TrGA_var1 (25 ppm) | 93.6 | 2.4 | 0.6 | 3.4 |
| FvGA (25 ppm) + TrGA_var1 (25 ppm) | 94.0 | 2.4 | 0.6 | 3.0 |
| TrGA_var1 (25 ppm) + TrGA (25 ppm) | 93.0 | 2.5 | 0.6 | 3.8 |

It is seen that a more effective conversion of starch into DP1 is achieved with combinations of glucoamylases in the mashing. Especially the blends: 25 ppm AfuGA+25 ppm FvGA, 25 ppm AfuGA+25 ppm TrGA_var1 and 25 ppm FvGA+25 ppm TrGA_var1 lead to an increased DP1 concentration compared to using the glucoamylases individually.

After wort fermentation % RDF was determined. The results are shown in table 6.

TABLE 6

RDF after fermentation of wort produced with different glucoamylases.

|  | RDF (%) |
|---|---|
| AfuGA (50 ppm) | 84.96 |
| FvGA (50 ppm) | 83.61 |
| TrGA_var1 (50 ppm) | 84.58 |
| TrGA (50 ppm) | 83.29 |
| AfuGA (25 ppm) + FvGA (25 ppm) | 85.31 |
| AfuGA (25 ppm) + TrGA_var1 (25 ppm) | 85.16 |
| FvGA (25 ppm) + TrGA_var1 (25 ppm) | 85.26 |

TABLE 6-continued

RDF after fermentation of wort produced with different glucoamylases.

|  | RDF (%) |
|---|---|
| TrGA_var1 (25 ppm) + TrGA (25 ppm) | 84.46 |

The obtained RDF values corresponds with the analysis of sugar composition in the applied wort, thus a relative higher content of DP1 sugar in the wort lead to a higher % RDF value of the fermentation. Thus, the blends: 25 ppm AfuGA+25 ppm FvGA, 25 ppm AfuGA+25 ppm TrGA_var1 and 25 ppm FvGA+25 ppm TrGA_var1 showed increased RDF values compared to the individually glucoamylases and the blend TrGA_var1 (25 ppm)+TrGA (25 ppm). Thus, certain combinations of glucoamylase may increase the fermentability by a more effective saccharification of starch into DP1 (being primarily glucose).

Example 7—Sequence Relationship of Glucoamylases

A multiple alignment of SEQ ID NO: 1-5 is shown below generated by the Geneious software package (Geneious® Pro 5.6.7) using CustalW alignment algorithm with a BLOSUM cost matrix and a gap opening cost of 10 and extension cost of 0.1.

```
                              1         10        20        30        40        50        60
                              |         |         |         |         |         |         |
TRrGA_var2 (seq ID no 5)     ----------SVDDFISTETPIALNNLLCNVGPDGCRAFGTSAGAVIASPSTIRPDYYM TrGA (seq ID no. 3)          ----------SVDDFISTETPIALNNLLCNVGPDGCRAFGTSAGAVIASPSTIDPDYYM TrGA_var1 (seq ID no. 4)     ----------SVDDFISTETPIALNNLLCNVGPDGCRAFGTSAGAVIASPSTIDPDYYM AfuGA (seq ID no. 2)         APQLSARATGSLDSWLGTETTVALNGILANIGADGAYAKSAKPGIIIASPSTSEPDYYYT FvGA (seq ID. no. 1)         -----SPGGSSLDRFISKEADISIKGVLANIGADGKRAQGAAPGAVVASPSRTDPDYWYT TrGA_var2 (seq ID no 5)      WTRDSALVFKNLIDRFTETYDAGLQRRIEQYITAQVTLQGLSNPSGSLADGSGLGEPKFE TrGA (seq ID no. 3)          WTRDSALVFKNLIDRFTETYDAGLQRRIEQYITAQVTLQGLSNPSGSLADGSGLGEPKFE TrGA_var1 (seq ID no. 4)     WTRDSALVFKNLIDRFTETYDAGLQRRIEQYITAQVTLQGLSNPSGSLADGSGLGEPKFE AfuGA (seq ID no. 2)         WTRDAALVTKVLVDLFRNG-NLGLQKVITEYVNSQAYLQTVSNPSGGLASG-GLAEPKYN FvGA (seq ID. no. 1)         WTRDSALTYKVLVERFIHG-DKSLQRKIDEYVSAQAKLQGVTNPSGGPESG-GLGEPKFH TrGA_var2 (seq ID no 5)      LTLKPFTGNWGRPQRDGPALRAIALIGYSKWLINNNYQSTVSNVIWPIVRNDLNYVAQYW TrGA (seq ID no. 3)          LTLKPFTGNWGRPQRDGPALRAIALIGYSKWLINNNYQSTVSNVIWPIVRNDLNYVAQYW TrGA_var1 (seq ID no. 4)     LTLKPFTGNWGRPQRDGPALRAIALIGYSKWLINNNYQSTVSNVIWPIVRNDLNYVAQYW AfuGA (seq ID no. 2)         VDMTAFTGAWGRPQRDGPALRATALIDFGNWLIDNGYSSYAVNNIWPIVRNDLSYVSQYW FvGA (seq ID. no. 1)         VNLTAFTGSWGRPQRDGPPLRATALTLYANWLVSHGDRSKAVNKVWPVIEKDLAYTVKFW TrGA_var2 (seq ID no 5)      NQTGFDLWEEVNGSSFFTVANQHRALVEGATLAATLGQSGSAYSSVAPQVLCFLQRFWVS TrGA (seq ID no. 3)          NQTGFDLWEEVNGSSFFTVANQHRALVEGATLAATLGQSGSAYSSVAPQVLCFLQRFWVS TrGA_var1 (seq ID no. 4)     NQTGFDLWEEVNGSSFFTVANQHRALVEGATLAATLGQSGSAYSSVAPQVLCFLQRFWVS AfuGA (seq ID no. 2)         SQSGFDLWEEVNSMSFFTVAVQHRALVEGSTFAKRVGASCSWCDSQAPQILCYMQSFWTG FvGA (seq ID. no. 1)         NRTGYDLWEEVNGSSFFTLSASHRALVEGAALAKKLGKSCSDCATNAPRVLCFMQSFWTG TrGA_var2 (seq ID no 5)      SGGYVDSNINTNEGRTGKDVNSVLTSIHTFDPNLGCDAGTFQPCSDKALSNLKVVVDSFR TrGA (seq ID no. 3)          SGGYVDSNINTNEGRTGKDVNSVLTSIHTFDPNLGCDAGTFQPCSDKALSNLKVVVDSFR
```

-continued

```
TrGA_var1 (seq ID no. 4)    SGGYVDSNINTNEGRTGKDVNSVLTSIHTFDPNLGCDAGTFQPCSDKALSNLKVVVDSFR AfuGA (seq ID no. 2)        S--YIN--ANTGGGRSGKDANTVLASIHTFDPEAGCDDTTFQPCSPRALANHKVYTDSFR FvGA (seq ID. no. 1)        S--YIDSNINVNDGRKGLDANSILSSIHTFDPSSKCTDSTFQPCSSRALANHKEVVDSFR tRga_VAR2 (seq ID no 5)     SIYGVNKGIPAGAAVAIGRYAEDVYYNGNPWYLATFAAAEQLYDAIYVWKKTGSITVTAT TrGA (seq ID no. 3)         SIYGVNKGIPAGAAVAIGRYAEDVYYNGNPWYLATFAAAEQLYDAIYVWKKTGSITVTAT TrGA_var1 (seq ID no. 4)    SIYGVNKGIPAGAAVAIGRYAEDVYYNGNPWYLATFAAAEQLYDAIYVWKKTGSITVTAT AfuGA (seq ID no. 2)        SVYAINSGIPQGAAVSAGRYPEDVYYNGNPWFLTTLAAAEQLYDAIYQWKKIGSISITST FvGA (seq ID. no. 1)        SIYGVNKNRGKGKAAAVGRYSEDVYYDGNPWYLATLAAAEQLYAAVYQWNKIGSITVDSV TrGA_var2 (seq ID no 5)     SLAFFQELVPGVTAGTYSSSSSTFTNIINAVSTYADGFLSEAAKYVPADGSLAEQFDRNS TrGA (seq ID no. 3)         SLAFFQELVPGVTAGTYSSSSSTFTNIINAVSTYADGFLSEAAKYVPADGSLAEQFDRNS TrGA_var 1 (seq ID no. 4)   SLAFFQELVPGVTAGTYSSSSSTFTNIINAVSTYADGFLSEAAKYVPADGSLAEQFDRNS AfuGA (seq ID no. 2)        SLAFFKDIYSSAAVGTYASSTSTFTDIINAVKTYADGYVSIVQAHAMNNGSLSEQFDKSS FvGA (seq ID. no. 1)        SLPFFSDLVPKVSKGTYRKNSKTYKAIIKAVTSYADGFVAVVQTYTPKDGSLAEQFDKST TrGA_var2 (seq ID no 5)     GTPLSALHLTWSYASFLTATARRAGIVPPSWANSSASTIPSTCSGASVVGSYSRPTATSF TrGA (seq ID no. 3)         GTPLSALHLTWSYASFLTATARRAGIVPPSWANSSASTIPSTCSGASVVGSYSRPTATSF TrGA_var1 (seq ID no. 4)    GTPLSAVHLTWSYASFLTAAARRAGIVPPSWANSSASTIPSTCSGASVVGSYSRPTATSF AfuGA (seq ID no. 2)        GLSLSARDLTWSYAAFLTANMRRNGVVPAPWGAASANSVPSSCSMGSATGTYSTATATSW FvGA (seq ID. no. 1)        GTPKSAVHLTWSYASFVGAAERRTGVVPPAWGESNANKVPAVCEAAP-------------

TrGA_var2 (seq ID no 5)     PPSQTP-KPG----VPSGTPYTP-----LPCATPTSVAVTFHELVSTQFGQTVKVAGNAA TrGA (seq ID no. 3)         PPSQTP-KPG----VPSGTPYTP-----LPCATPTSVAVTFHELVSTQFGQTVKVAGNAA TrGA_var1 (seq ID no. 4)    PPSQTP-KPG----VPSGTPYTP-----LPCATPTSVAVTFHELVSTQFGHTVKVAGNAA AfuGA (seq ID no. 2)        PSTLTSGSPGSTTTVGTTTSTTSGTAAETACATPTAVAVTFNEIATTTYGENVYIVGSIS FvGA (seq ID. no. 1)        ----------------------------ACDTTITFNVKNVDVTS---DQKVYIVGGIT TrGA_var2 (seq ID no 5)     ALGNWSTSAAVALDAVNYRDNHPLWIGTVNLEAGDVVEYKYINVGQDGSVTWESDPNHTY TrGA (seq ID no. 3)         ALGNWSTSAAVALDAVNYADNHPLWIGTVNLEAGDVVEYKYINVGQDGSVTWESDPNHTY TrGA_var1 (seq ID no. 4)    ALGNWSTSAAVALDAVNYRDNHPLWIGTVNLEAGDVVEYKYIIVGQDGSVTWESDPNHTY AfuGA (seq ID no. 2)        ELGNWDTSKAVALSASKYTSSNNLWYVSVTLPAGTTFEYKYIRKESDGSIVWESDPNRSY FvGA (seq ID. no. 1)        QLSNWAPADGIALEES--TSTKGLWTVKVKIPSDTSFEYKYIKKTSDGTVTWESDPNNSA TrGA_var 2 (seq ID no 5)    TVPAVACVTQVVKEDTWQS TrGA (seq ID no. 3)         TVPAVACVTQVVKEDTWQS TrGA_var1 (seq ID no. 4)    TVPAVACVTQVVKEDTWQS AfuGA (seq ID no. 2)        TVPAACGVSTATENDTWQ- FvGA (seq ID. no. 1)        ATGSKCG-SSSTINDEWR-
```

The calculated pairwise sequence identity is shown in table 7. The sequence identity is calculated as (# Identities)/(# Identities+# Differences)*100%, using the following definition: # Identities, displays the absolute number of positions where two sequence have an identical residue and # Differences, displays the absolute number of positions where two sequence have non-identical residues on the alignment.

It's clear that TrGA, TrGA_var1 and TrGA_var2 are closely related with more than 99.2% sequence identity whereas both AfuGA and FvGA are only distantly related to any of the other present GA's with maximum of 57.2% and 50.7% pair-wise identity respectively.

TABLE 7

Pairwise sequence identity in percent (%) between the different glucoamylases with seq ID no. 1-5.

| | TrGA | TrGA_var2 | TrGA_var1 | AfuGA | FvGA |
|---|---|---|---|---|---|
| TrGA | | 99.7% | 99.2% | 57.2% | 50.5% |
| TrGA_var2 | 99.7% | | 99.2% | 57.2% | 50.3% |

TABLE 7-continued

Pairwise sequence identity in percent (%) between the different glucoamylases with seq ID no. 1-5.

|  | TrGA | TrGA_var2 | TrGA_var1 | AfuGA | FvGA |
|---|---|---|---|---|---|
| TrGA_var1 | 99.2% | 99.2% |  | 57.2% | 50.7% |
| AfuGA | 57.2% | 57.2% | 57.2% |  | 50.6% |
| FvGA | 50.5% | 50.3% | 50.7% | 50.6% |  |

Example 8—the Glucoamylase Synergy on DP1 Generation and Sequence Relationship The synergy of applying two glucoamylase was calculated as the additional DP1 generated by applying two glucoamylase compared to one. Thus, the additional DP1 generated by 2 GA's in example 4 was used to calculate the maximum concentration of DP1 obtained by a combination of two GA's subtracted the DP1 concentration of 93% obtained by one glucoamylase. The additional DP1 content (synergy) is shown in table 8 (calculated from results in example 4) together with the pairwise sequence identity in percent as shown in example 7.

TABLE 8

The pairwise glucoamylase synergies given as additional DP1 (above 93%) and the pairwise sequence identity in percent (%).

|  | Additional DP1 in % | % seq ID |
|---|---|---|
| TrGA var 2:TrGA | 0.20 | 99.7 |
| TrGA var 1:TrGA | 0.16 | 99.2 |
| TrGA var 2:TrGA var 1 | 0.31 | 99.2 |
| TrGA var1:FvGA | 0.67 | 50.7 |
| TrGA var1:AfuGA | 0.88 | 57.2 |
| TrGA var2:AfuGA | 0.83 | 57.2 |
| TrGA:AfuGA | 0.99 | 57.2 |
| TrGA:FvGA | 1.16 | 50.5 |
| AfuGA:FvGA | 1.32 | 50.6 |
| TrGA var2:FvGA | 1.63 | 50.3 |

The result clearly shows that the combination of more distantly related sequences, e.g. TrGA:FvGA gave rise to higher synergy (1.16%) compared to the combination of highly related sequences such as, e.g. TrGA:TrGA_var1 (0.16%). Considering these findings, its indeed relevant that more distantly related sequences may have more diverse substrate specificities and thus give rise to higher synergies in e.g. the mashing operation within brewing.

Example 9—Application of Three Glucoamylases in Mashing Analysis

Glucoamylases was tested in mashing operation with 55% Pilsner malt (Pilsner malt; Fuglsang Denmark, Batch 13 Jan. 2016) and 45% Corn grits (Nordgetreide GmBH Lubec, Germany, Batch: 2 May 2016), using a water to grist ratio of 3.8:1. Pilsner malt was milled at a Buhler Miag mill with a 0.5 mm setting. The corn adjunct was liquefied in the follow way: Corn grits (31.5 g), Malt (milled pilsner malt, 5.5 g) and tap water (141 g) was mixed in mashing bath (Lockner, LG-electronics) cups and pH adjusted to pH 5.4 with 2.5M sulphuric acid. The adjunct was mashed with the program; heated to 43° C. and kept for 1 minute for mashing in; heated to 72° C. for 14.5 minutes by increasing temperature with 2° C./minute; kept at 72° C. for 5 minutes; heated to 74° C. for 1 minute by increasing temperature with 2° C./minute; kept at 74° C. for 2 minutes; heated to 76° C. for 1 minute by increasing temperature with 2° C./minute; kept at 76° C. for 2 minutes; heated to 78° C. for 1 minute by increasing temperature with 2° C./minute; kept at 78° C. for 2 minutes. heated to 80° C. for 1 minute by increasing temperature with 2° C./minute; kept at 80° C. for 5 minutes; heated to 95° C. for 7.5 minutes by increasing temperature with 2° C./minute; kept at 95° C. for 15 minutes and mashing off. Hereafter the adjunct was cooled to 64° C. and combined with the main mash. In the main mash, malt (milled pilsner malt, 122 g) and tap water (122 g) was mixed in a mashing bath (Lochner, LG-electronics) cup and pH adjusted to pH 5.4 with 2.5M sulphuric acid. The main mash was heated to 43° C. by increasing temperature with 2° C./minute; kept at 43° C. for 10 minutes and heated to 64° C. for 21 minutes by increase temperature with 1° C./minute. Thus, to each cup with 178 g adjunct (liquefied corn, malt and water) enzymes where added according to table 9 below when temperature reached 64° C.

TABLE 9

Combinations of the individuual glucoamylases added mashing either pairwise or as triplet and the total glucoamylase concentration in ppm.

| Glucoamylases | ppm |
|---|---|
| AfuGA (15 ppm) + FvGA (15 ppm) | 30.00 |
| AfuGA (25 ppm) + FvGA (25 ppm) | 50.00 |
| AfuGA (35 ppm) + FvGA (35 ppm) | 70.00 |
| AfuGA (7.5 ppm) + FvGA (7.85 ppm) + TrGA_var1 (2.33 ppm) | 17.70 |
| AfuGA (11.25 ppm) + FvGA (11.75 ppm) + TrGA_var1 (3.50 ppm) | 26.50 |
| AfuGA (15 ppm) + FvGA (15.75 ppm) + TrGA_var1 (4.65 ppm) | 35.40 |
| AfuGA (18.75 ppm) + FvGA (19.65 ppm) + TrGA_var1 (5.80 ppm) | 44.20 |
| AfuGA (26.25 ppm) + FvGA (27.50 ppm) + TrGA_var1 (2.33 ppm) | 61.90 |

Following the mash where held at 64° C. for 240 minutes followed by a ramp to 79° C. by 1° C./minute. The mash was finally held at 79° C. for 15 min. At the end of mashing. the mashes were made up to 350 g and filtered. Filtrate volumes were measured after 30 minutes. The pH was adjusted to pH 5.2 with 2.5 M sulphuric acid and one pellet of bitter hops from Hopfenveredlung. St. Johann: Alpha content of 16.0% (EBC 7.70 specific HPLC analysis. 1 Oct. 2013). was added to each flask (210 g). The wort samples were boiled for 60 minutes in a boiling bath and wort were cooled down to 17° C. and analysed by HPLC and Original Extract (OE) Extract in the beer samples after mashing was measured using an Anton Paar (DMA 5000) following Dupont Standard Instruction Brewing, 23.8580-B28.

The result of HPLC and extract analysis of the wort after saccharification by different glucoamylses are shown in table 10 with the relative sugar composition in the wort.

TABLE 10

Relative distribution of sugars from HPLC analysis of wort and OE.

| | average % | | | | Extract (° P) |
|---|---|---|---|---|---|
| | DP1 | DP2 | DP3 | DP4+ | OE |
| AfuGA (15 ppm) + FvGA (15 ppm) | 88.5 | 4.4 | 1.8 | 5.3 | 16.6 |
| AfuGA (25 ppm) + FvGA (25 ppm) | 92.8 | 2.1 | 1.1 | 4.0 | 16.61 |
| AfuGA (35 ppm) + FvGA (35 ppm) | 92.2 | 2.6 | 1.0 | 4.2 | 16.68 |
| AfuGA (7.5 ppm) + FvGA (7.85 ppm) + TrGA_var1 (2.33 ppm) | 79.5 | 11.9 | 1.7 | 6.9 | 16.41 |
| AfuGA (11.25 ppm) + FvGA (11.75 ppm) + TrGA_var1 (3.50 ppm) | 90.8 | 3.8 | 1.2 | 4.2 | 16.49 |
| AfuGA (15 ppm) + FvGA (15.75 ppm) + TrGA_var1 (4.65 ppm) | 92.3 | 2.4 | 1.2 | 4.1 | 16.65 |
| AfuGA (18.75 ppm) + Fv GA (19.65 ppm) + TrGA_var1 (5.80 ppm) | 93.2 | 2.2 | 1.0 | 3.6 | 16.68 |
| AfuGA (26.25 ppm) + FvGA (27.50 ppm) + TrGA_var1 (2.33 ppm) | 93.4 | 2.3 | 0.8 | 3.6 | 16.6 |

It is seen that a more effective conversion of starch into DP1 is achieved with a triplet combination of AfuGA+FvGA+TrGA_var1 compared to AfuGA+FvGA also used in example 6. For example, the use of AfuGA (18.75 ppm), FvGA (19.65 ppm) and TrGA_var1 (5.80 ppm) gave 93.2% DP1 whereas AfuGA (25 ppm) and FvGA (25 ppm) in the current mash produced 92.8% DP1.

SEQ IDs

SEQ ID NO: 1 sets forth the mature amino acid sequence of the glucoamylase from *Fusarium verticillioides* (FvGA):
SPGGSSLDRFISKEADISIKGVLANIGADGKRAQGAAPGAVVASPSRTDPDYWYTWTRDSALTYKVLVER
FIHGDKSLQRKIDEYVSAQAKLQGVTNPSGGPESGGLGEPKFHVNLTAFTGSWGRPQRDGPPLRATALTL
YANWLVSHGDRSKAVNKVWPVIEKDLAYTVKFWNRTGYDLWEEVNGSSFFTLSASHRALVEGAALAKKLG
KSCSDCATNAPRVLCFMQSFWTGSYIDSNINVNDGRKGLDANSILSSIHTFDPSSKCTDSTFQPCSSRAL
ANHKEVVDSFRSIYGVNKNRGKGKAAAVGRYSEDVYYDGNPWYLATLAAAEQLYAAVYQWNKIGSITVDS
VSLPFFSDLVPKVSKGTYRKNSKTYKAIIKAVTSYADGFVAVVQTYTPKDGSLAEQFDKSTGTPKSAVHL
TWSYASFVGAAERRTGVVPPAWGESNANKVPAVCEAAPACDTTITFNVKNVDVTSDQKVYIVGGITQLSN
WAPADGIALEESTSTKGLWTVKVKIPSDTSFEYKYIKKTSDGTVTWESDPNNSAATGSKCGSSSTINDEW
R SEQ ID NO: 2 sets forth the mature amino acid sequence of the glucoamylase from *Aspergillus fumigatus* (AfuGA):
APQLSARATGSLDSWLGTETTVALNGILANIGADGAYAKSAKPGIIIASPSTSEPDYYYTWTRDAALVTK
VLVDLFRNGNLGLQKVITEYVNSQAYLQTVSNPSGGLASGGLAEPKYNVDMTAFTGAWGRPQRDGPALRA
TALIDPGNWLIDNGYSSYAVNNIWPIVRNDLSYVSQYWSQSGFDLWEEVNSMSFFTVAVQHRALVEGSTF
AKRVGASCSWCDSQAPQILCYMQSFWTGSYINANTGGGRSGKDANTVLASIHTFDPEAGCDDTTFQPCSP
RALANHKVYTDSFRSVYAINSGIPQGAAVSAGRYPEDVYYNGNPWFLTTLAAAEQLYDAIYQWKKIGSIS
ITSTSLAFFKDIYSSAAVGTYASSTSTFTDIINAVKTYADGYVSIVQAHAMNNGSLSEQFDKSSGLSLSA
RDLTWSYAAFLTANMRRNGVVPAPWGAASANSVPSSCSMGSATGTYSTATATSWPSTLTSGSPGSTTTVG
TTTSTTSGTAAETACATPTAVAVTFNEIATTTYGENVYIVGSISELGNWDTSKAVALSASKYTSSNNLWY
VSVTLPAGTTFEYKYIRKESDGSIVWESDPNRSYTVPAACGVSTATENDTWQ SEQ ID NO: 3 sets forth the mature amino acid sequence of the glucoamylase from *Trichoderma reesie* (TrGA).
SVDDFISTETPIALNNLLCNVGPDGCRAFGTSAGAVIASPSTIDPDYYYMWTRDSALVFKNLID
RFTETYDAGLQRRIEQYITAQVTLQGLSNPSGSLADGSGLGEPKFELTLKPFTGNWGRPQRDGP
ALRAIALIGYSKWLINNNYQSTVSNVIWPIVRNDLNYVAQYWNQTGFDLWEEVNGSSFFTVANQ
HRALVEGATLAATLGQSGSAYSSVAPQVLCFLQRFWVSSGGYVDSNINTNEGRTGKDVNSVLTS
IHTFDPNLGCDAGTFQPCSDKALSNLKVVVDSFRSIYGVNKGIPAGAAVAIGRYAEDVYYNGNP
WYLATFAAAEQLYDAIYVWKKTGSITVTATSLAFFQELVPGVTAGTYSSSSSTFTNIINAVSTY
ADGFLSEAAKYVPADGSLAEQFDRNSGTPLSALHLTWSYASFLTATARRAGIVPPSWANSSAST
IPSTCSGASVVGSYSRPTATSFPPSQTPKPGVPSGTPYTPLPCATPTSVAVTFHELVSTQFGQT
VKVAGNAAALGNWSTSAAVALDAVNYADNHPLWIGTVNLEAGDVVEYKYINVGQDGSVTWESDP
NHTYTVPAVACVTQVVKEDTWQS SEQ ID NO: 4 sets forth the mature amino acid sequence of the glucoamylase variant from *Trichoderma reesie* including the mutations L417V, T430A, Q511H, A539R and N563I (TrGA_var1):
SVDDFISTETPIALNNLLCNVGPDGCRAFGTSAGAVIASPSTIDPDYYYMWTRDSALVFK
NLIDRFTETYDAGLQRRIEQYITAQVTLQGLSNPSGSLADGSGLGEPKFELTLKPFTGNW
GRPQRDGPALRAIALIGYSKWLINNNYQSTVSNVIWPIVRNDLNYVAQYWNQTGFDLW
EEVNGSSFFTVANQHRALVEGATLAATLGQSGSAYSSVAPQVLCFLQRFWVSSGGYVD
SNINTNEGRTGKDVNSVLTSIHTFDPNLGCDAGTFQPCSDKALSNLKVVVDSFRSIYGVN
KGIPAGAAVAIGRYAEDVYYNGNPWYLATFAAAEQLYDAIYVWKKTGSITVTATSLAF
FQELVPGVTAGTYSSSSSTFTNIINAVSTYADGFLSEAAKYVPADGSLAEQFDRNSGTPLS
AVHLTWSYASFLTAAARRAGIVPPSWANSSASTIPSTCSGASVVGSYSRPTATSFPPSQTP
KPGVPSGTPYTPLPCATPTSVAVTFHELVSTQFGHTVKVAGNAAALGNWSTSAAVALD
AVNYRDNHPLWIGTVNLEAGDVVEYKYIIVGQDGSVTWESDPNHTYTVPAVACVTQV
VKEDTWQS

SEQ IDs

SEQ ID NO: 5 sets forth the mature amino acid sequence of the glucoamylase variant from *Trichoderma reesie* including the mutations D44R and A539R (TrGA_var2):

SVDDFISTETPIALNNLLCNVGPDGCRAFGTSAGAVIASPSTIRPDYYYMWTRDSALVFK
NLIDRFTETYDAGLQRRIEQYITAQVTLQGLSNPSGSLADGSGLGEPKFELTLKPFTGNW
GRPQRDGPALRAIALIGYSKWLINNNYQSTVSNVIWPIVRNDLNYVAQYWNQTGFDLW
EEVNGSSFFTVANQHRALVEGATLAATLGQSGSAYSSVAPQVLCFLQRFWVSSGGYVD
SNINTNEGRTGKDVNSVLTSIHTFDPNLGCDAGTFQPCSDKALSNLKVVVDSFRSIYGVN
KGIPAGAAVAIGRYAEDVYYNGNPWYLATFAAAEQLYDAIYVWKKTGSITVTATSLAF
FQELVPGVTAGTYSSSSSTFTNIINAVSTYADGFLSEAAKYVPADGSLAEQFDRNSGTPLS
ALHLTWSYASFLTATARRAGIVPPSWANSSASTIPSTCSGASVVGSYSRPTATSFPPSQTP
KPGVPSGTPYTPLPCATPTSVAVTFHELVSTQFGQTVKVAGNAAALGNWSTSAAVALD
AVNYRDNHPLWIGTVNLEAGDVVEYKYINVGQDGSVTWESDPNHTYTVPAVACVTQV
VKEDTWQS

What is claimed is:

1. A method for producing a brewer's wort having increased DP1 sugar comprising adding to a mash comprising a grist a first glucoamylase comprising a Fusarium venenatum glycoamylase as set forth in SEQ ID NO: 1 (FvGA) or a sequence having at least 80% identity thereto, a second glucoamylase comprising an *Aspergillus fumigatus* glucoamylase as set forth in SEQ ID NO: 2 (AfuGA) or a sequence having at least 80% identity thereto and a third glucoamylase comprising a Trichoderma reesei variant glucoamylase as set forth in SEQ ID NO: 4 (TrGA var1) or a sequence having at least 80% identity thereto to produce the brewer's wort.

2. The method of claim 1 wherein said first glucoamylase comprises a sequence having at least 90% identity to SEQ ID NO:1, said second glucoamylase comprises a sequence having at least 90% identity to SEQ ID NO:2, and said third glucoamylase comprises a sequence having at least 90% identity to SEQ ID NO:4.

3. The method of claim 2 wherein said first glucoamylase comprises a sequence having at least 95% identity SEQ ID NO:1, said second glucoamylas comprises a sequence having at least 95% identity SEQ ID NO:2, and said third glucoamylase comprises a sequence having at least 95% identity SEQ ID NO:4.

4. The method of claim 3 wherein said first glucoamylase comprises a sequence having at least 99% identity to SEQ ID NO:1, said second glucoamylase comprises a sequence having at least 99% identity to SEQ ID NO:2, and said third glucoamylase comprises a sequence having at least 99% identity to SEQ ID NO:4.

5. The method of claim 4 wherein said first glucoamylase comprises a sequence as set forth in SEQ ID NO: 1, said second glucoamylase comprises a sequence as set forth in SEQ ID NO: 2, and said third glucoamylase comprises a sequence as set forth in SEQ ID NO: 4.

6. The method of claim 5 wherein the wort has less than about 4% DP4/4+.

7. The method of claim 6 wherein the wort has less than about 3.8% DP4/4+.

8. The method of claim 7 wherein the wort has less than about 3.5% DP4/4+.

9. The method of claim 8 wherein the wort has about 3% DP4/4+.

10. The method of claim 5 wherein the grist comprises malt.

11. The method of claim 10 wherein the grist further comprises corn, rice, sorghum, barley, wheat, rye, oats or tapioca or mixtures thereof.

12. The method of claim 5 wherein the wort has about 93% or greater DP1.

13. The method of claim 12 wherein the wort has about 94% or greater DP1.

14. The method of claim 5 further comprising the step of fermenting the wort to produce a beer.

15. The method of claim 14 wherein the beer has an RDF of greater than 84%.

16. The method of claim 15 wherein the beer has an RDF of greater than 85%.

17. The method of claim 16 wherein the beer has an RDF of greater than 86%.

18. The method of claim 17 wherein the beer has an RDF of greater than 87%.

19. The method of claim 18 wherein the beer has an RDF of greater than 88%.

20. The method of claim 19 wherein the beer has an RDF of greater than 89%.

21. The method of claim 5 wherein said first glucoamylase is about 26.25 ppm, said second glucoamylase is about 27.5 ppm and said third glucoamylase is about 2.33 ppm.

* * * * *

SEQUENCE LISTING

<160> NUMBER OF SEQ ID NOS: 5

<210> SEQ ID NO 1
<211> LENGTH: 561
<212> TYPE: PRT
<213> ORGANISM: Fusarium verticillioides

<400> SEQUENCE: 1

```
Ser Pro Gly Gly Ser Ser Leu Asp Arg Phe Ile Ser Lys Glu Ala Asp
1               5                   10                  15

Ile Ser Ile Lys Gly Val Leu Ala Asn Ile Gly Ala Asp Gly Lys Arg
            20                  25                  30

Ala Gln Gly Ala Ala Pro Gly Ala Val Val Ala Ser Pro Ser Arg Thr
        35                  40                  45

Asp Pro Asp Tyr Trp Tyr Thr Trp Thr Arg Asp Ser Ala Leu Thr Tyr
    50                  55                  60

Lys Val Leu Val Glu Arg Phe Ile His Gly Asp Lys Ser Leu Gln Arg
65                  70                  75                  80

Lys Ile Asp Glu Tyr Val Ser Ala Gln Ala Lys Leu Gln Gly Val Thr
                85                  90                  95

Asn Pro Ser Gly Gly Pro Glu Ser Gly Gly Leu Gly Glu Pro Lys Phe
            100                 105                 110

His Val Asn Leu Thr Ala Phe Thr Gly Ser Trp Gly Arg Pro Gln Arg
        115                 120                 125

Asp Gly Pro Pro Leu Arg Ala Thr Ala Leu Thr Leu Tyr Ala Asn Trp
    130                 135                 140

Leu Val Ser His Gly Asp Arg Ser Lys Ala Val Asn Lys Val Trp Pro
145                 150                 155                 160

Val Ile Glu Lys Asp Leu Ala Tyr Thr Val Lys Phe Trp Asn Arg Thr
                165                 170                 175

Gly Tyr Asp Leu Trp Glu Glu Val Asn Gly Ser Ser Phe Phe Thr Leu
            180                 185                 190

Ser Ala Ser His Arg Ala Leu Val Glu Gly Ala Ala Leu Ala Lys Lys
        195                 200                 205

Leu Gly Lys Ser Cys Ser Asp Cys Ala Thr Asn Ala Pro Arg Val Leu
    210                 215                 220

Cys Phe Met Gln Ser Phe Trp Thr Gly Ser Tyr Ile Asp Ser Asn Ile
225                 230                 235                 240

Asn Val Asn Asp Gly Arg Lys Gly Leu Asp Ala Asn Ser Ile Leu Ser
```

```
                245                 250                 255
Ser Ile His Thr Phe Asp Pro Ser Ser Lys Cys Thr Asp Ser Thr Phe
            260                 265                 270

Gln Pro Cys Ser Ser Arg Ala Leu Ala Asn His Lys Glu Val Val Asp
        275                 280                 285

Ser Phe Arg Ser Ile Tyr Gly Val Asn Lys Asn Arg Gly Lys Gly Lys
    290                 295                 300

Ala Ala Ala Val Gly Arg Tyr Ser Glu Asp Val Tyr Asp Gly Asn
305                 310                 315                 320

Pro Trp Tyr Leu Ala Thr Leu Ala Ala Glu Gln Leu Tyr Ala Ala
                325                 330                 335

Val Tyr Gln Trp Asn Lys Ile Gly Ser Ile Thr Val Asp Ser Val Ser
            340                 345                 350

Leu Pro Phe Phe Ser Asp Leu Val Pro Lys Val Ser Lys Gly Thr Tyr
        355                 360                 365

Arg Lys Asn Ser Lys Thr Tyr Lys Ala Ile Ile Lys Ala Val Thr Ser
    370                 375                 380

Tyr Ala Asp Gly Phe Val Ala Val Gln Thr Tyr Thr Pro Lys Asp
385                 390                 395                 400

Gly Ser Leu Ala Glu Gln Phe Asp Lys Ser Thr Gly Thr Pro Lys Ser
                405                 410                 415

Ala Val His Leu Thr Trp Ser Tyr Ala Ser Phe Val Gly Ala Ala Glu
            420                 425                 430

Arg Arg Thr Gly Val Val Pro Pro Ala Trp Gly Glu Ser Asn Ala Asn
        435                 440                 445

Lys Val Pro Ala Val Cys Glu Ala Pro Ala Cys Asp Thr Thr Ile
    450                 455                 460

Thr Phe Asn Val Lys Asn Val Asp Val Thr Ser Asp Gln Lys Val Tyr
465                 470                 475                 480

Ile Val Gly Gly Ile Thr Gln Leu Ser Asn Trp Ala Pro Ala Asp Gly
                485                 490                 495

Ile Ala Leu Glu Glu Ser Thr Ser Thr Lys Gly Leu Trp Thr Val Lys
            500                 505                 510

Val Lys Ile Pro Ser Asp Thr Ser Phe Glu Tyr Lys Tyr Ile Lys Lys
        515                 520                 525

Thr Ser Asp Gly Thr Val Thr Trp Glu Ser Asp Pro Asn Asn Ser Ala
    530                 535                 540

Ala Thr Gly Ser Lys Cys Gly Ser Ser Thr Ile Asn Asp Glu Trp
545                 550                 555                 560

Arg

<210> SEQ ID NO 2
<211> LENGTH: 612
<212> TYPE: PRT
<213> ORGANISM: Aspergillus fumigatus

<400> SEQUENCE: 2

Ala Pro Gln Leu Ser Ala Arg Ala Thr Gly Ser Leu Asp Ser Trp Leu
1               5                   10                  15

Gly Thr Glu Thr Thr Val Ala Leu Asn Gly Ile Leu Ala Asn Ile Gly
                20                  25                  30

Ala Asp Gly Ala Tyr Ala Lys Ser Ala Lys Pro Gly Ile Ile Ile Ala
            35                  40                  45

Ser Pro Ser Thr Ser Glu Pro Asp Tyr Tyr Tyr Thr Trp Thr Arg Asp
```

```
                50                  55                  60
Ala Ala Leu Val Thr Lys Val Leu Val Asp Leu Phe Arg Asn Gly Asn
 65                  70                  75                  80

Leu Gly Leu Gln Lys Val Ile Thr Glu Tyr Val Asn Ser Gln Ala Tyr
                 85                  90                  95

Leu Gln Thr Val Ser Asn Pro Ser Gly Leu Ala Ser Gly Gly Leu
                    100                 105                 110

Ala Glu Pro Lys Tyr Asn Val Asp Met Thr Ala Phe Thr Gly Ala Trp
                115                 120                 125

Gly Arg Pro Gln Arg Asp Gly Pro Ala Leu Arg Ala Thr Ala Leu Ile
            130                 135                 140

Asp Phe Gly Asn Trp Leu Ile Asp Asn Gly Tyr Ser Ser Tyr Ala Val
145                 150                 155                 160

Asn Asn Ile Trp Pro Ile Val Arg Asn Asp Leu Ser Tyr Val Ser Gln
                165                 170                 175

Tyr Trp Ser Gln Ser Gly Phe Asp Leu Trp Glu Glu Val Asn Ser Met
            180                 185                 190

Ser Phe Phe Thr Val Ala Val Gln His Arg Ala Leu Val Glu Gly Ser
            195                 200                 205

Thr Phe Ala Lys Arg Val Gly Ala Ser Cys Ser Trp Cys Asp Ser Gln
210                 215                 220

Ala Pro Gln Ile Leu Cys Tyr Met Gln Ser Phe Trp Thr Gly Ser Tyr
225                 230                 235                 240

Ile Asn Ala Asn Thr Gly Gly Arg Ser Gly Lys Asp Ala Asn Thr
                245                 250                 255

Val Leu Ala Ser Ile His Thr Phe Asp Pro Glu Ala Gly Cys Asp Asp
            260                 265                 270

Thr Thr Phe Gln Pro Cys Ser Pro Arg Ala Leu Ala Asn His Lys Val
            275                 280                 285

Tyr Thr Asp Ser Phe Arg Ser Val Tyr Ala Ile Asn Ser Gly Ile Pro
            290                 295                 300

Gln Gly Ala Ala Val Ser Ala Gly Arg Tyr Pro Glu Asp Val Tyr Tyr
305                 310                 315                 320

Asn Gly Asn Pro Trp Phe Leu Thr Thr Leu Ala Ala Ala Glu Gln Leu
                325                 330                 335

Tyr Asp Ala Ile Tyr Gln Trp Lys Lys Ile Gly Ser Ile Ser Ile Thr
            340                 345                 350

Ser Thr Ser Leu Ala Phe Phe Lys Asp Ile Tyr Ser Ala Ala Val
            355                 360                 365

Gly Thr Tyr Ala Ser Ser Thr Ser Thr Phe Thr Asp Ile Ile Asn Ala
370                 375                 380

Val Lys Thr Tyr Ala Asp Gly Tyr Val Ser Ile Val Gln Ala His Ala
385                 390                 395                 400

Met Asn Asn Gly Ser Leu Ser Glu Gln Phe Asp Lys Ser Ser Gly Leu
                405                 410                 415

Ser Leu Ser Ala Arg Asp Leu Thr Trp Ser Tyr Ala Ala Phe Leu Thr
            420                 425                 430

Ala Asn Met Arg Arg Asn Gly Val Val Pro Ala Pro Trp Gly Ala Ala
            435                 440                 445

Ser Ala Asn Ser Val Pro Ser Ser Cys Ser Met Gly Ser Ala Thr Gly
            450                 455                 460

Thr Tyr Ser Thr Ala Thr Ala Thr Ser Trp Pro Ser Thr Leu Thr Ser
465                 470                 475                 480
```

```
Gly Ser Pro Gly Ser Thr Thr Thr Val Gly Thr Thr Ser Thr Thr
                485                 490                 495

Ser Gly Thr Ala Ala Glu Thr Ala Cys Ala Thr Pro Thr Ala Val Ala
            500                 505                 510

Val Thr Phe Asn Glu Ile Ala Thr Thr Thr Tyr Gly Glu Asn Val Tyr
        515                 520                 525

Ile Val Gly Ser Ile Ser Glu Leu Gly Asn Trp Asp Thr Ser Lys Ala
    530                 535                 540

Val Ala Leu Ser Ala Ser Lys Tyr Thr Ser Ser Asn Asn Leu Trp Tyr
545                 550                 555                 560

Val Ser Val Thr Leu Pro Ala Gly Thr Thr Phe Glu Tyr Lys Tyr Ile
                565                 570                 575

Arg Lys Glu Ser Asp Gly Ser Ile Val Trp Glu Ser Asp Pro Asn Arg
                580                 585                 590

Ser Tyr Thr Val Pro Ala Ala Cys Gly Val Ser Thr Ala Thr Glu Asn
            595                 600                 605

Asp Thr Trp Gln
        610

<210> SEQ ID NO 3
<211> LENGTH: 599
<212> TYPE: PRT
<213> ORGANISM: Trichoderma reesie

<400> SEQUENCE: 3

Ser Val Asp Asp Phe Ile Ser Thr Glu Thr Pro Ile Ala Leu Asn Asn
1               5                   10                  15

Leu Leu Cys Asn Val Gly Pro Asp Gly Cys Arg Ala Phe Gly Thr Ser
                20                  25                  30

Ala Gly Ala Val Ile Ala Ser Pro Ser Thr Ile Asp Pro Asp Tyr Tyr
            35                  40                  45

Tyr Met Trp Thr Arg Asp Ser Ala Leu Val Phe Lys Asn Leu Ile Asp
    50                  55                  60

Arg Phe Thr Glu Thr Tyr Asp Ala Gly Leu Gln Arg Arg Ile Glu Gln
65                  70                  75                  80

Tyr Ile Thr Ala Gln Val Thr Leu Gln Gly Leu Ser Asn Pro Ser Gly
                85                  90                  95

Ser Leu Ala Asp Gly Ser Gly Leu Gly Glu Pro Lys Phe Glu Leu Thr
            100                 105                 110

Leu Lys Pro Phe Thr Gly Asn Trp Gly Arg Pro Gln Arg Asp Gly Pro
        115                 120                 125

Ala Leu Arg Ala Ile Ala Leu Ile Gly Tyr Ser Lys Trp Leu Ile Asn
    130                 135                 140

Asn Asn Tyr Gln Ser Thr Val Ser Asn Val Ile Trp Pro Ile Val Arg
145                 150                 155                 160

Asn Asp Leu Asn Tyr Val Ala Gln Tyr Trp Asn Gln Thr Gly Phe Asp
                165                 170                 175

Leu Trp Glu Glu Val Asn Gly Ser Ser Phe Phe Thr Val Ala Asn Gln
            180                 185                 190

His Arg Ala Leu Val Glu Gly Ala Thr Leu Ala Ala Thr Leu Gly Gln
        195                 200                 205

Ser Gly Ser Ala Tyr Ser Val Ala Pro Gln Val Leu Cys Phe Leu
    210                 215                 220

Gln Arg Phe Trp Val Ser Ser Gly Gly Tyr Val Asp Ser Asn Ile Asn
```

```
            225                 230                 235                 240
    Thr Asn Glu Gly Arg Thr Gly Lys Asp Val Asn Ser Val Leu Thr Ser
                    245                 250                 255

Ile His Thr Phe Asp Pro Asn Leu Gly Cys Asp Ala Gly Thr Phe Gln
                    260                 265                 270

Pro Cys Ser Asp Lys Ala Leu Ser Asn Leu Lys Val Val Asp Ser
                275                 280                 285

Phe Arg Ser Ile Tyr Gly Val Asn Lys Gly Ile Pro Ala Gly Ala Ala
                290                 295                 300

Val Ala Ile Gly Arg Tyr Ala Glu Asp Val Tyr Tyr Asn Gly Asn Pro
    305                 310                 315                 320

Trp Tyr Leu Ala Thr Phe Ala Ala Glu Gln Leu Tyr Asp Ala Ile
                    325                 330                 335

Tyr Val Trp Lys Lys Thr Gly Ser Ile Thr Val Thr Ala Thr Ser Leu
                    340                 345                 350

Ala Phe Phe Gln Glu Leu Val Pro Gly Val Thr Ala Gly Thr Tyr Ser
                355                 360                 365

Ser Ser Ser Ser Thr Phe Thr Asn Ile Ile Asn Ala Val Ser Thr Tyr
                370                 375                 380

Ala Asp Gly Phe Leu Ser Glu Ala Ala Lys Tyr Val Pro Ala Asp Gly
    385                 390                 395                 400

Ser Leu Ala Glu Gln Phe Asp Arg Asn Ser Gly Thr Pro Leu Ser Ala
                    405                 410                 415

Leu His Leu Thr Trp Ser Tyr Ala Ser Phe Leu Thr Ala Thr Ala Arg
                    420                 425                 430

Arg Ala Gly Ile Val Pro Pro Ser Trp Ala Asn Ser Ser Ala Ser Thr
                435                 440                 445

Ile Pro Ser Thr Cys Ser Gly Ala Ser Val Val Gly Ser Tyr Ser Arg
                    450                 455                 460

Pro Thr Ala Thr Ser Phe Pro Pro Ser Gln Thr Pro Lys Pro Gly Val
    465                 470                 475                 480

Pro Ser Gly Thr Pro Tyr Thr Pro Leu Pro Cys Ala Thr Pro Thr Ser
                    485                 490                 495

Val Ala Val Thr Phe His Glu Leu Val Ser Thr Gln Phe Gly Gln Thr
                500                 505                 510

Val Lys Val Ala Gly Asn Ala Ala Ala Leu Gly Asn Trp Ser Thr Ser
                515                 520                 525

Ala Ala Val Ala Leu Asp Ala Val Asn Tyr Ala Asp Asn His Pro Leu
                530                 535                 540

Trp Ile Gly Thr Val Asn Leu Glu Ala Gly Asp Val Val Glu Tyr Lys
    545                 550                 555                 560

Tyr Ile Asn Val Gly Gln Asp Gly Ser Val Thr Trp Glu Ser Asp Pro
                    565                 570                 575

Asn His Thr Tyr Thr Val Pro Ala Val Ala Cys Val Thr Gln Val Val
                    580                 585                 590

Lys Glu Asp Thr Trp Gln Ser
                    595

<210> SEQ ID NO 4
<211> LENGTH: 599
<212> TYPE: PRT
<213> ORGANISM: Trichoderma reesie

<400> SEQUENCE: 4
```

```
Ser Val Asp Asp Phe Ile Ser Thr Glu Thr Pro Ile Ala Leu Asn
1               5                   10                  15

Leu Leu Cys Asn Val Gly Pro Asp Gly Cys Arg Ala Phe Gly Thr Ser
            20                  25                  30

Ala Gly Ala Val Ile Ala Ser Pro Ser Thr Ile Asp Pro Asp Tyr Tyr
        35                  40                  45

Tyr Met Trp Thr Arg Asp Ser Ala Leu Val Phe Lys Asn Leu Ile Asp
    50                  55                  60

Arg Phe Thr Glu Thr Tyr Asp Ala Gly Leu Gln Arg Ile Glu Gln
65                  70                  75                  80

Tyr Ile Thr Ala Gln Val Thr Leu Gln Gly Leu Ser Asn Pro Ser Gly
                85                  90                  95

Ser Leu Ala Asp Gly Ser Gly Leu Gly Glu Pro Lys Phe Glu Leu Thr
            100                 105                 110

Leu Lys Pro Phe Thr Gly Asn Trp Gly Arg Pro Gln Arg Asp Gly Pro
        115                 120                 125

Ala Leu Arg Ala Ile Ala Leu Ile Gly Tyr Ser Lys Trp Leu Ile Asn
    130                 135                 140

Asn Asn Tyr Gln Ser Thr Val Ser Asn Val Ile Trp Pro Ile Val Arg
145                 150                 155                 160

Asn Asp Leu Asn Tyr Val Ala Gln Tyr Trp Asn Gln Thr Gly Phe Asp
                165                 170                 175

Leu Trp Glu Glu Val Asn Gly Ser Ser Phe Phe Thr Val Ala Asn Gln
            180                 185                 190

His Arg Ala Leu Val Glu Gly Ala Thr Leu Ala Ala Thr Leu Gly Gln
        195                 200                 205

Ser Gly Ser Ala Tyr Ser Ser Val Ala Pro Gln Val Leu Cys Phe Leu
    210                 215                 220

Gln Arg Phe Trp Val Ser Ser Gly Gly Tyr Val Asp Ser Asn Ile Asn
225                 230                 235                 240

Thr Asn Glu Gly Arg Thr Gly Lys Asp Val Asn Ser Val Leu Thr Ser
                245                 250                 255

Ile His Thr Phe Asp Pro Asn Leu Gly Cys Asp Ala Gly Thr Phe Gln
            260                 265                 270

Pro Cys Ser Asp Lys Ala Leu Ser Asn Leu Lys Val Val Asp Ser
        275                 280                 285

Phe Arg Ser Ile Tyr Gly Val Asn Lys Gly Ile Pro Ala Gly Ala Ala
    290                 295                 300

Val Ala Ile Gly Arg Tyr Ala Glu Asp Val Tyr Tyr Asn Gly Asn Pro
305                 310                 315                 320

Trp Tyr Leu Ala Thr Phe Ala Ala Ala Glu Gln Leu Tyr Asp Ala Ile
                325                 330                 335

Tyr Val Trp Lys Lys Thr Gly Ser Ile Thr Val Thr Ala Thr Ser Leu
            340                 345                 350

Ala Phe Phe Gln Glu Leu Val Pro Gly Val Thr Ala Gly Thr Tyr Ser
        355                 360                 365

Ser Ser Ser Ser Thr Phe Thr Asn Ile Ile Asn Ala Val Ser Thr Tyr
    370                 375                 380

Ala Asp Gly Phe Leu Ser Glu Ala Ala Lys Tyr Val Pro Ala Asp Gly
385                 390                 395                 400

Ser Leu Ala Glu Gln Phe Asp Arg Asn Ser Gly Thr Pro Leu Ser Ala
                405                 410                 415

Val His Leu Thr Trp Ser Tyr Ala Ser Phe Leu Thr Ala Ala Ala Arg
```

-continued

```
            420                 425                 430
Arg Ala Gly Ile Val Pro Pro Ser Trp Ala Asn Ser Ser Ala Ser Thr
            435                 440                 445

Ile Pro Ser Thr Cys Ser Gly Ala Ser Val Val Gly Ser Tyr Ser Arg
450                 455                 460

Pro Thr Ala Thr Ser Phe Pro Pro Ser Gln Thr Pro Lys Pro Gly Val
465                 470                 475                 480

Pro Ser Gly Thr Pro Tyr Thr Pro Leu Pro Cys Ala Thr Pro Thr Ser
                485                 490                 495

Val Ala Val Thr Phe His Glu Leu Val Ser Thr Gln Phe Gly His Thr
            500                 505                 510

Val Lys Val Ala Gly Asn Ala Ala Ala Leu Gly Asn Trp Ser Thr Ser
            515                 520                 525

Ala Ala Val Ala Leu Asp Ala Val Asn Tyr Arg Asp Asn His Pro Leu
            530                 535                 540

Trp Ile Gly Thr Val Asn Leu Glu Ala Gly Asp Val Val Glu Tyr Lys
545                 550                 555                 560

Tyr Ile Ile Val Gly Gln Asp Gly Ser Val Thr Trp Glu Ser Asp Pro
                565                 570                 575

Asn His Thr Tyr Thr Val Pro Ala Val Ala Cys Val Thr Gln Val Val
            580                 585                 590

Lys Glu Asp Thr Trp Gln Ser
            595

<210> SEQ ID NO 5
<211> LENGTH: 599
<212> TYPE: PRT
<213> ORGANISM: Trichoderma reesie

<400> SEQUENCE: 5

Ser Val Asp Asp Phe Ile Ser Thr Glu Thr Pro Ile Ala Leu Asn Asn
1               5                   10                  15

Leu Leu Cys Asn Val Gly Pro Asp Gly Cys Arg Ala Phe Gly Thr Ser
                20                  25                  30

Ala Gly Ala Val Ile Ala Ser Pro Ser Thr Ile Arg Pro Asp Tyr Tyr
            35                  40                  45

Tyr Met Trp Thr Arg Asp Ser Ala Leu Val Phe Lys Asn Leu Ile Asp
        50                  55                  60

Arg Phe Thr Glu Thr Tyr Asp Ala Gly Leu Gln Arg Ile Glu Gln
65                  70                  75                  80

Tyr Ile Thr Ala Gln Val Thr Leu Gln Gly Leu Ser Asn Pro Ser Gly
                85                  90                  95

Ser Leu Ala Asp Gly Ser Gly Leu Gly Glu Pro Lys Phe Glu Leu Thr
            100                 105                 110

Leu Lys Pro Phe Thr Gly Asn Trp Gly Arg Pro Gln Arg Asp Gly Pro
        115                 120                 125

Ala Leu Arg Ala Ile Ala Leu Ile Gly Tyr Ser Lys Trp Leu Ile Asn
    130                 135                 140

Asn Asn Tyr Gln Ser Thr Val Ser Asn Val Ile Trp Pro Ile Val Arg
145                 150                 155                 160

Asn Asp Leu Asn Tyr Val Ala Gln Tyr Trp Asn Gln Thr Gly Phe Asp
                165                 170                 175

Leu Trp Glu Glu Val Asn Gly Ser Ser Phe Phe Thr Val Ala Asn Gln
            180                 185                 190
```

```
His Arg Ala Leu Val Glu Gly Ala Thr Leu Ala Ala Thr Leu Gly Gln
            195                 200                 205

Ser Gly Ser Ala Tyr Ser Ser Val Ala Pro Gln Val Leu Cys Phe Leu
        210                 215                 220

Gln Arg Phe Trp Val Ser Ser Gly Gly Tyr Val Asp Ser Asn Ile Asn
225                 230                 235                 240

Thr Asn Glu Gly Arg Thr Gly Lys Asp Val Asn Ser Val Leu Thr Ser
                245                 250                 255

Ile His Thr Phe Asp Pro Asn Leu Gly Cys Asp Ala Gly Thr Phe Gln
            260                 265                 270

Pro Cys Ser Asp Lys Ala Leu Ser Asn Leu Lys Val Val Asp Ser
        275                 280                 285

Phe Arg Ser Ile Tyr Gly Val Asn Lys Gly Ile Pro Ala Gly Ala Ala
290                 295                 300

Val Ala Ile Gly Arg Tyr Ala Glu Asp Val Tyr Tyr Asn Gly Asn Pro
305                 310                 315                 320

Trp Tyr Leu Ala Thr Phe Ala Ala Glu Gln Leu Tyr Asp Ala Ile
                325                 330                 335

Tyr Val Trp Lys Lys Thr Gly Ser Ile Thr Val Thr Ala Thr Ser Leu
            340                 345                 350

Ala Phe Phe Gln Glu Leu Val Pro Gly Val Thr Ala Gly Thr Tyr Ser
        355                 360                 365

Ser Ser Ser Ser Thr Phe Thr Asn Ile Ile Asn Ala Val Ser Thr Tyr
        370                 375                 380

Ala Asp Gly Phe Leu Ser Glu Ala Ala Lys Tyr Val Pro Ala Asp Gly
385                 390                 395                 400

Ser Leu Ala Glu Gln Phe Asp Arg Asn Ser Gly Thr Pro Leu Ser Ala
                405                 410                 415

Leu His Leu Thr Trp Ser Tyr Ala Ser Phe Leu Thr Ala Thr Ala Arg
            420                 425                 430

Arg Ala Gly Ile Val Pro Pro Ser Trp Ala Asn Ser Ser Ala Ser Thr
        435                 440                 445

Ile Pro Ser Thr Cys Ser Gly Ala Ser Val Val Gly Ser Tyr Ser Arg
        450                 455                 460

Pro Thr Ala Thr Ser Phe Pro Pro Ser Gln Thr Pro Lys Pro Gly Val
465                 470                 475                 480

Pro Ser Gly Thr Pro Tyr Thr Pro Leu Pro Cys Ala Thr Pro Thr Ser
                485                 490                 495

Val Ala Val Thr Phe His Glu Leu Val Ser Thr Gln Phe Gly Gln Thr
            500                 505                 510

Val Lys Val Ala Gly Asn Ala Ala Ala Leu Gly Asn Trp Ser Thr Ser
        515                 520                 525

Ala Ala Val Ala Leu Asp Ala Val Asn Tyr Arg Asp Asn His Pro Leu
        530                 535                 540

Trp Ile Gly Thr Val Asn Leu Glu Ala Gly Asp Val Val Glu Tyr Lys
545                 550                 555                 560

Tyr Ile Asn Val Gly Gln Asp Gly Ser Val Thr Trp Glu Ser Asp Pro
                565                 570                 575

Asn His Thr Tyr Thr Val Pro Ala Val Ala Cys Val Thr Gln Val Val
            580                 585                 590

Lys Glu Asp Thr Trp Gln Ser
            595
```